United States Patent
Shalom

(10) Patent No.: US 9,179,646 B2
(45) Date of Patent: Nov. 10, 2015

(54) WALKING AID FOR DISABLED FOUR-LEGGED ANIMALS

(75) Inventor: Nir Shalom, Or-Yehuda, IL (US)

(73) Assignees: NEKUDA D.M. TECHNOLOGIES AND DESIGN LTD., Tel Aviv (IL); NIR SHALOM, Or-Yehuda (IL)

( * ) Notice: Subject to any disclaimer, the term of this patent is extended or adjusted under 35 U.S.C. 154(b) by 71 days.

(21) Appl. No.: 13/807,935

(22) PCT Filed: Jul. 7, 2011

(86) PCT No.: PCT/IL2011/000542
§ 371 (c)(1),
(2), (4) Date: Jan. 2, 2013

(87) PCT Pub. No.: WO2012/007935
PCT Pub. Date: Jan. 19, 2012

(65) Prior Publication Data
US 2013/0104813 A1    May 2, 2013

Related U.S. Application Data

(60) Provisional application No. 61/363,249, filed on Jul. 11, 2010.

(51) Int. Cl.
*A61D 3/00* (2006.01)
*A01K 15/02* (2006.01)
*A61H 3/04* (2006.01)

(52) U.S. Cl.
CPC *A01K 15/02* (2013.01); *A61H 3/04* (2013.01); *A61H 2203/03* (2013.01)

(58) Field of Classification Search
CPC ........... A61H 3/04; A61H 2003/043; A61H 2003/046; A61H 2203/03; A61D 3/00; A01K 15/02

USPC ........ 119/712, 722, 723, 724, 725, 726, 727, 119/728; 280/657, 290
IPC ............... A61H 3/04; A61D 3/00; A01K 15/02
See application file for complete search history.

(56) References Cited

U.S. PATENT DOCUMENTS 626,736 A * 6/1899 Taulbee ................. 280/290
1,517,352 A * 12/1924 Foote .................. 280/11.201
(Continued)

FOREIGN PATENT DOCUMENTS

JP    2011019571 A  *  2/2011

OTHER PUBLICATIONS

PCT International Search Report for PCT/IL11/00542, 3 pages, Dec. 15, 2011.
(Continued)

*Primary Examiner* — Lisa Tsang
(74) *Attorney, Agent, or Firm* — Roach Brown McCarthy & Gruber, P.C.; Kevin D. McCarthy

(57) ABSTRACT

A walking aid for a four-legged animal having disabled hind legs comprises an engagement member for engaging a body portion between fore legs and hind legs of the animal; a collapsible resting mechanism connected to the engagement member and to at least one wheel assembly in contact with an underlying surface; and a locking mechanism operatively connectable to the at least one wheel assembly in such a way that the at least one wheel assembly is freely rotatable during forward motion of said walking aid but is rotationally immobilizable following rearward motion of the walking aid. The resting mechanism is operational to facilitate movement from a walking state to a resting state or from a resting state to a walking state only when the at least one wheel assembly is rotationally immobilized.

20 Claims, 21 Drawing Sheets

(56) References Cited

U.S. PATENT DOCUMENTS

| | | | |
|---|---|---|---|
| 2,126,387 A | 8/1938 | Hinds | |
| 3,180,678 A * | 4/1965 | McCabe | 297/5 |
| 3,215,117 A | 11/1965 | Short | |
| 3,790,187 A * | 2/1974 | Radu et al. | 280/11.201 |
| 3,937,418 A | 2/1976 | Critelli | |
| 4,375,203 A | 3/1983 | Parkes | |
| 4,641,847 A | 2/1987 | Busse | |
| 4,777,910 A | 10/1988 | Pecor | |
| 4,821,676 A | 4/1989 | Hulterstrum | |
| 5,011,175 A * | 4/1991 | Nicholson et al. | 280/304.1 |
| 5,224,444 A | 7/1993 | Hill et al. | |
| 5,371,922 A | 12/1994 | Chern et al. | |
| 6,216,636 B1 | 4/2001 | Butchko | |
| 6,431,572 B1 | 8/2002 | Harden et al. | |
| 6,659,478 B2 | 12/2003 | Hallgrimsson et al. | |
| 6,729,268 B1 | 5/2004 | Costell | |
| 6,830,255 B2 * | 12/2004 | Cheng | 280/87.041 |
| 7,549,398 B2 | 6/2009 | Robinson et al. | |
| 2008/0064296 A1 | 3/2008 | Lang | |
| 2008/0231006 A1 * | 9/2008 | Van Eeden | 280/7.15 |
| 2010/0117326 A1 * | 5/2010 | Stump et al. | 280/200 |
| 2011/0109058 A1 * | 5/2011 | Janis et al. | 280/263 |

OTHER PUBLICATIONS

PCT Written Opinion of the International Searching Authority for PCT/IL11/00542, 5 pages, Dec. 8, 2011.

* cited by examiner

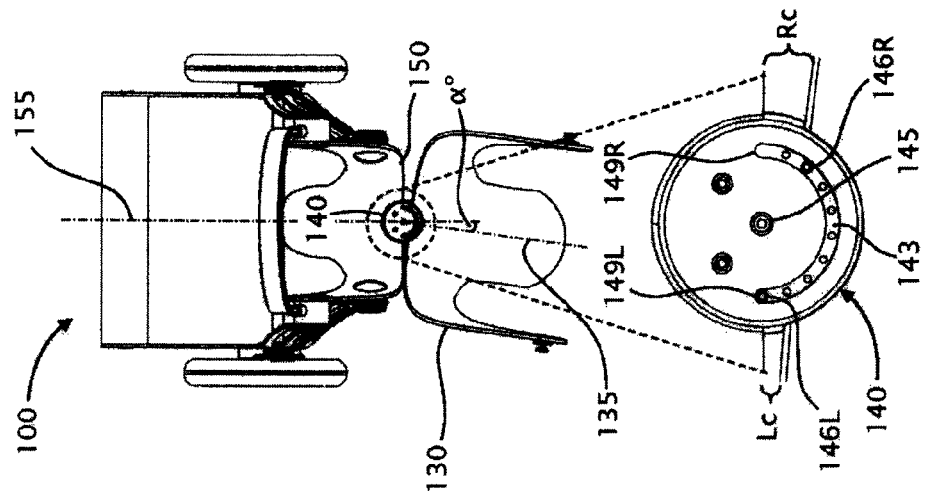
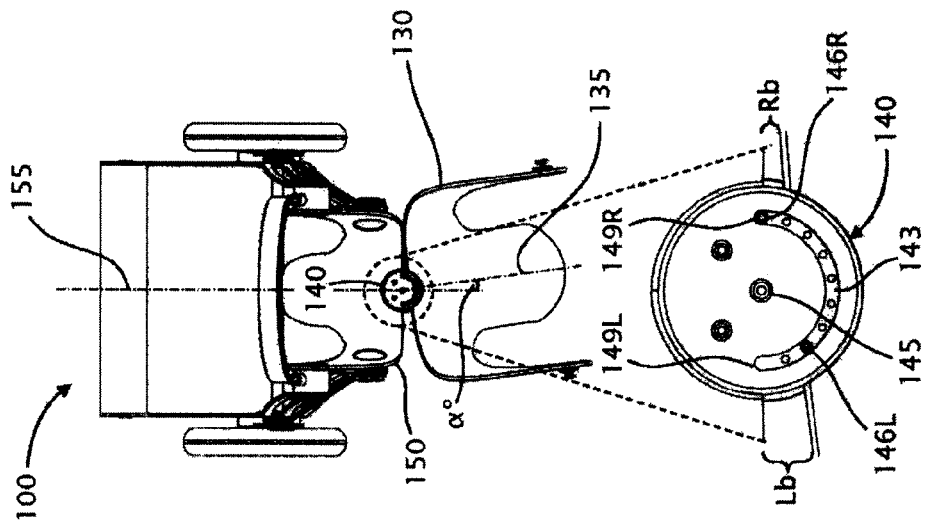
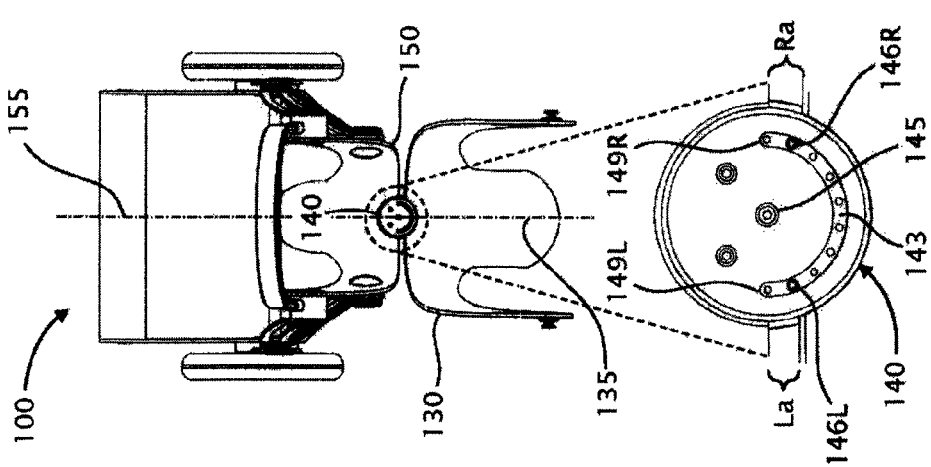

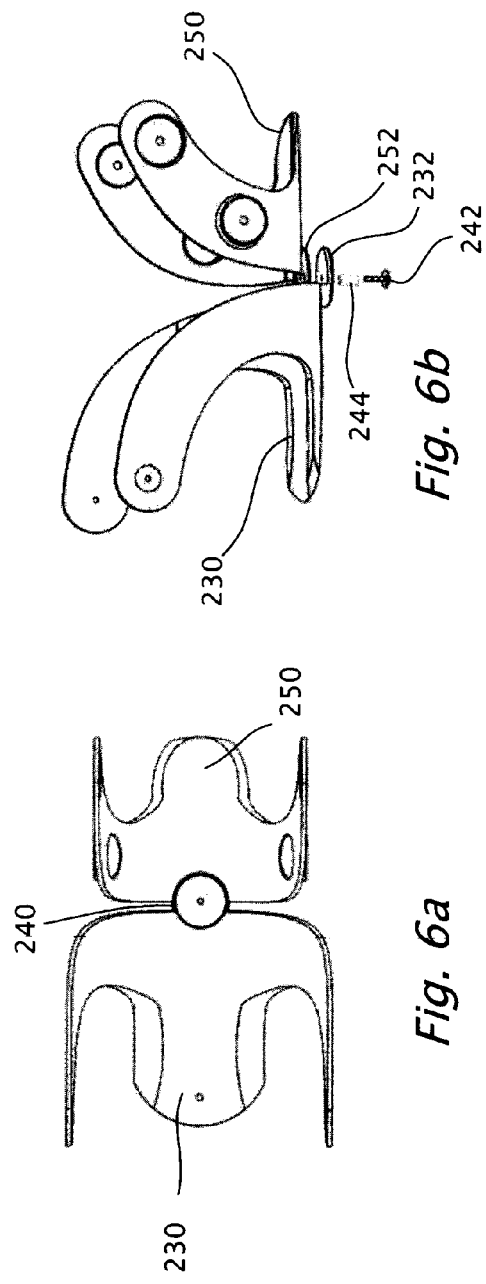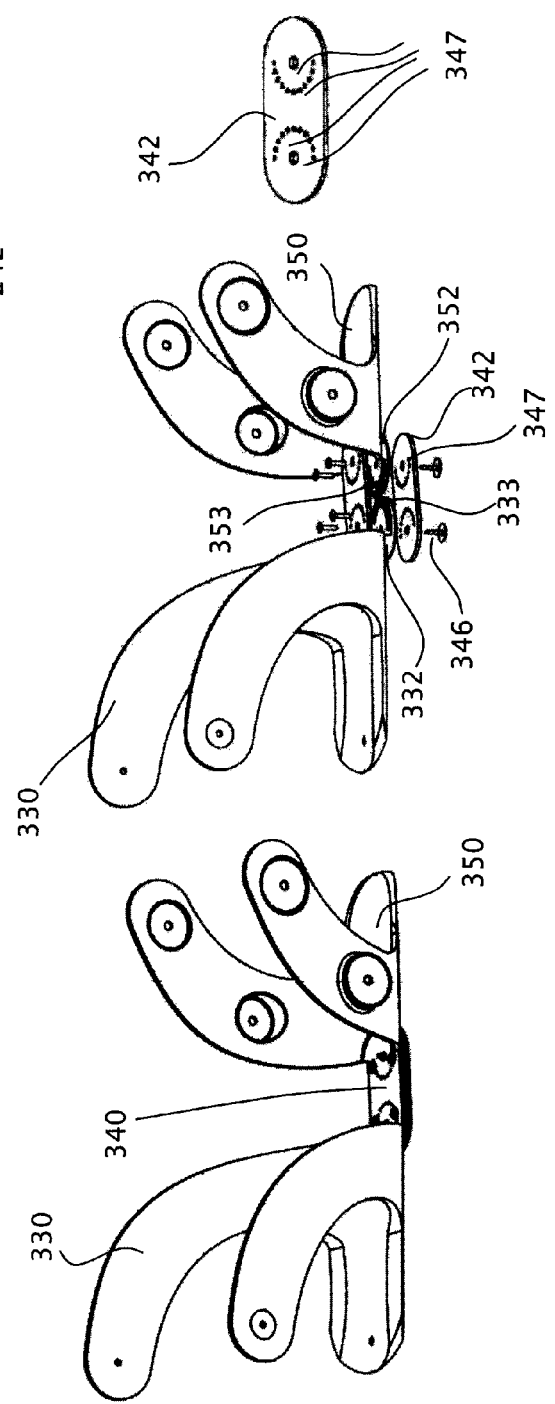

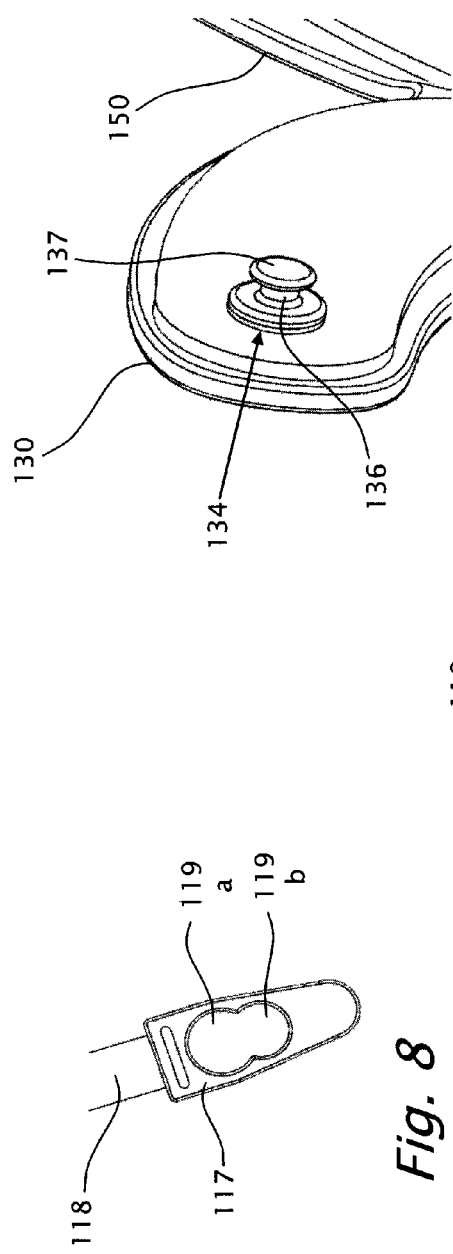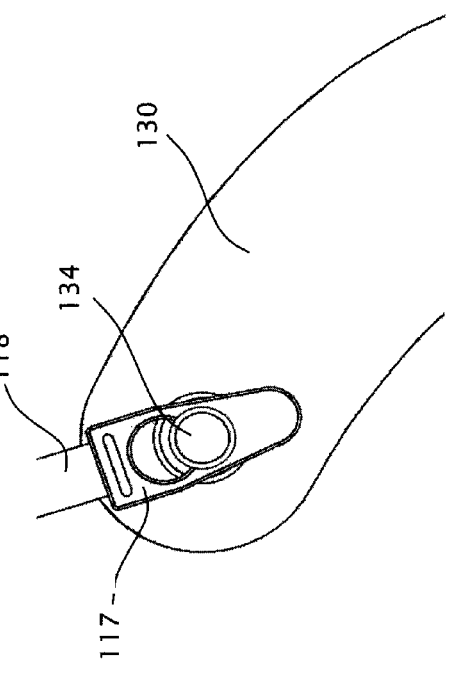

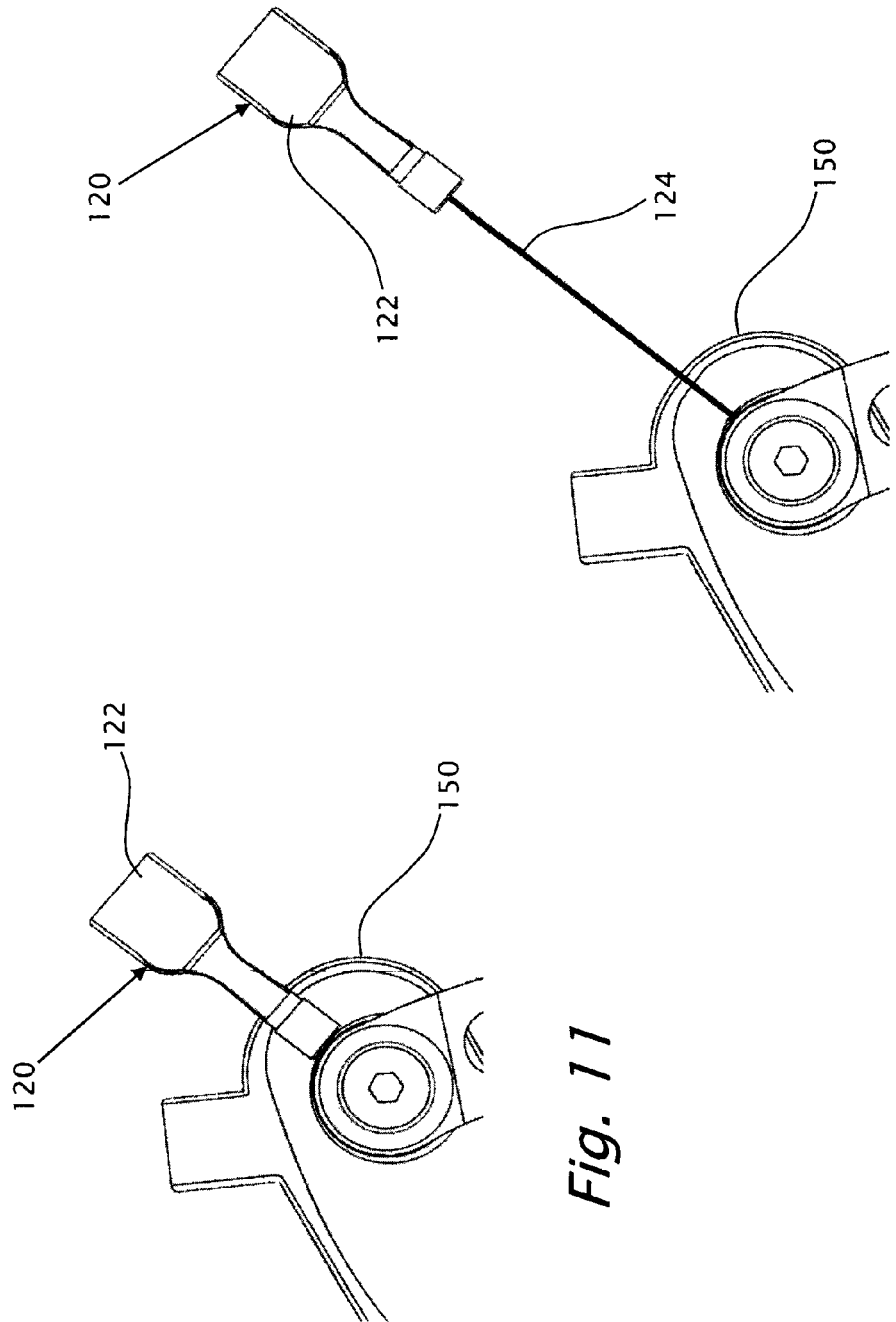

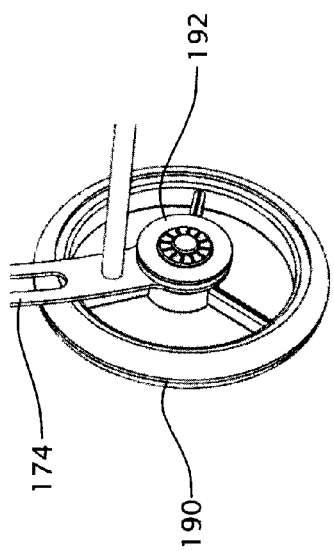
Fig. 15
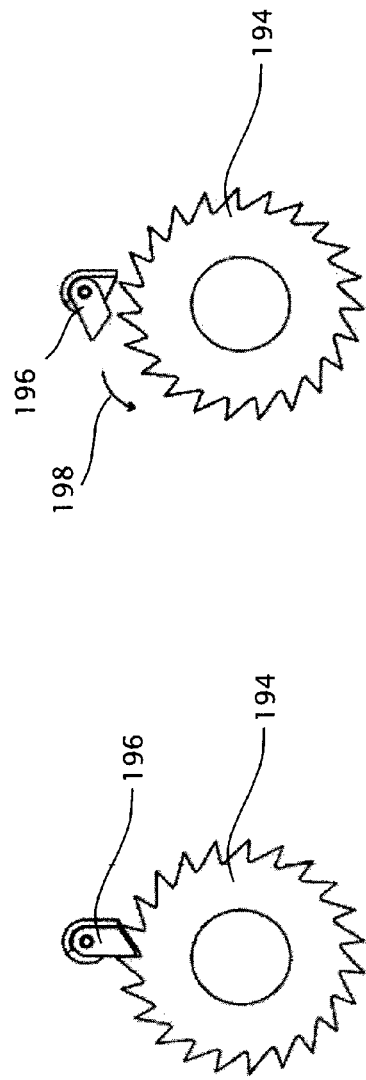
Fig. 16b
Fig. 16a

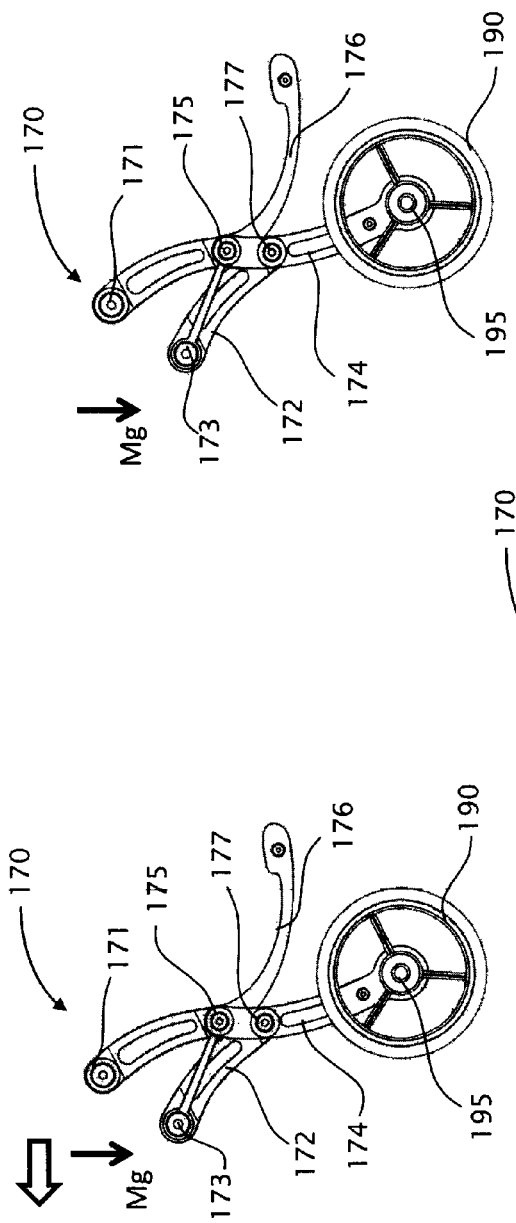

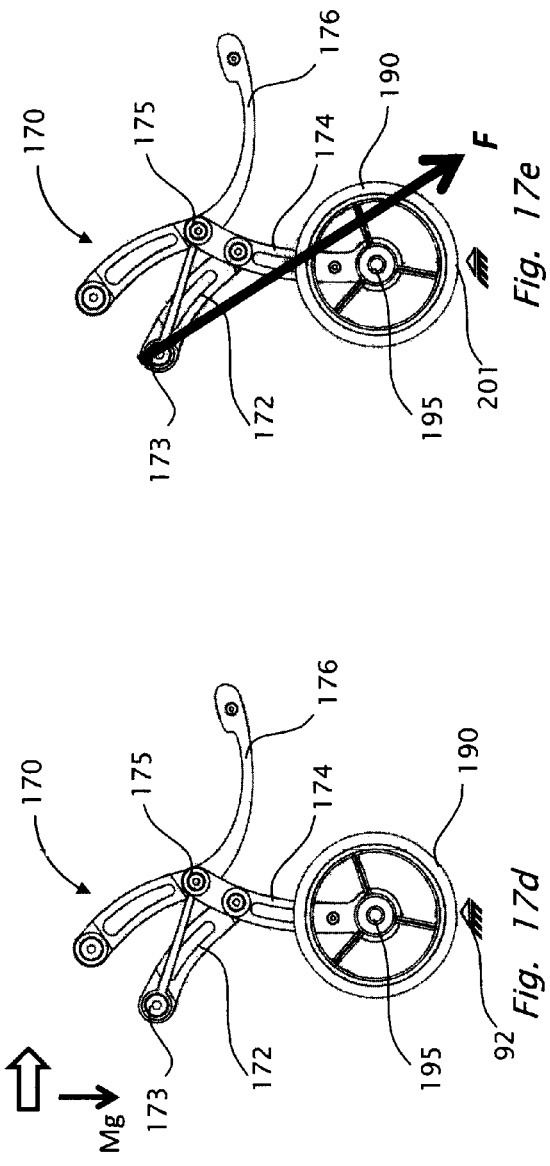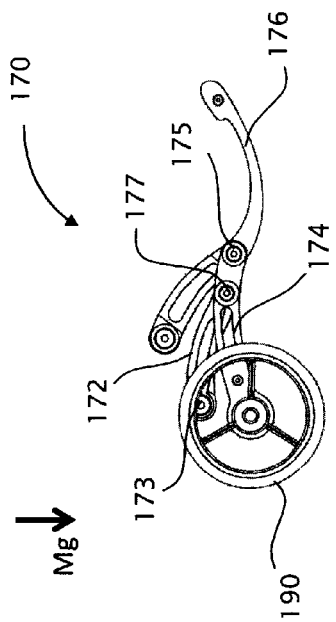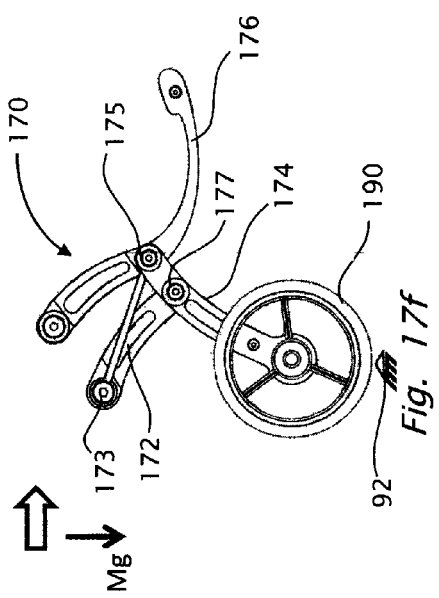

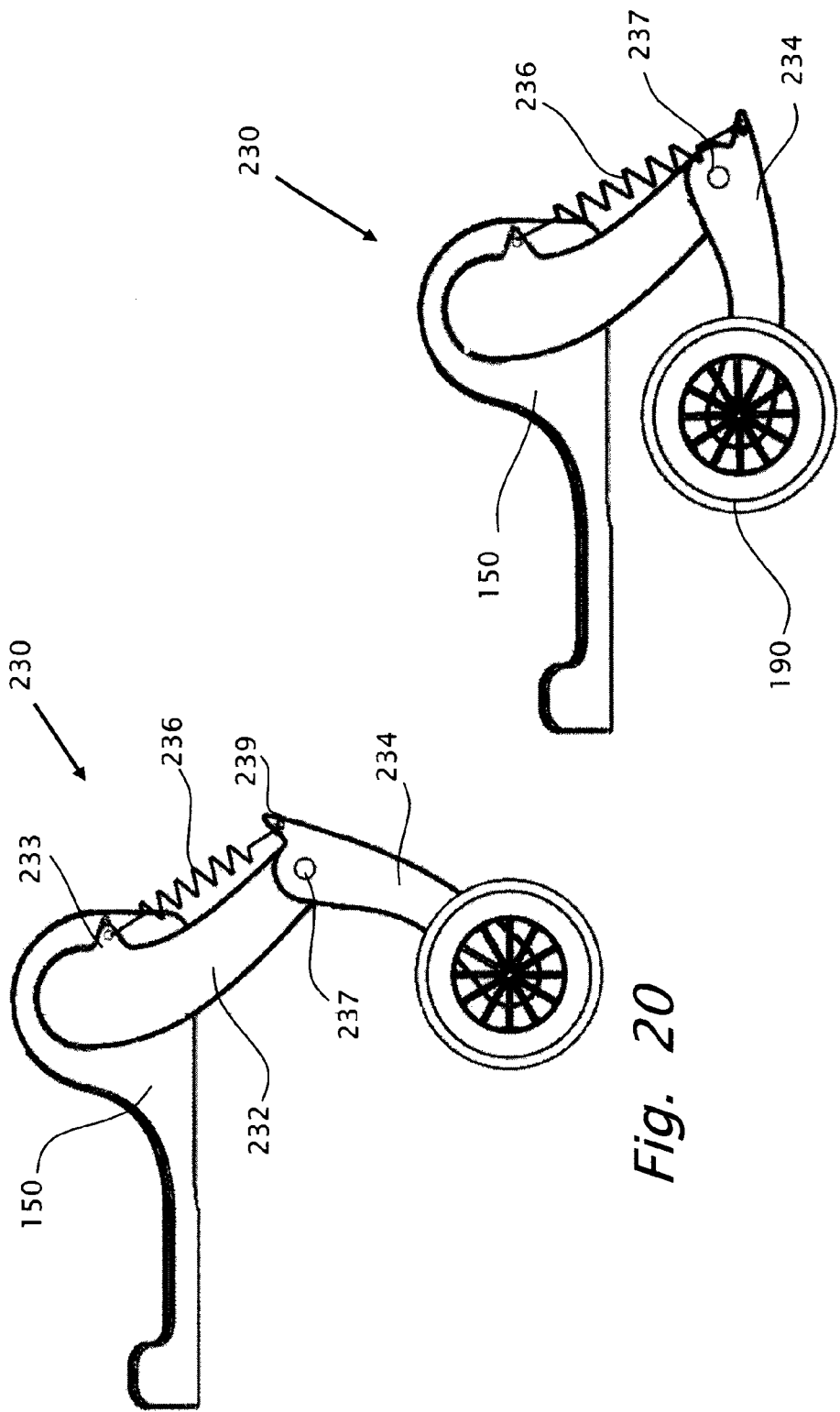

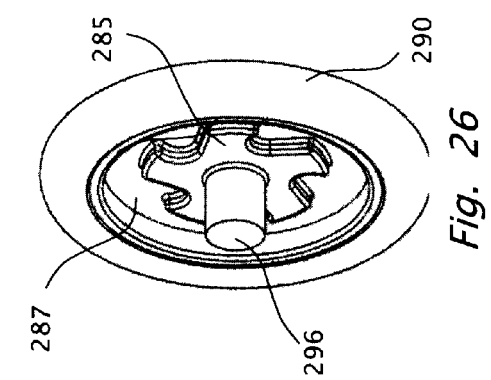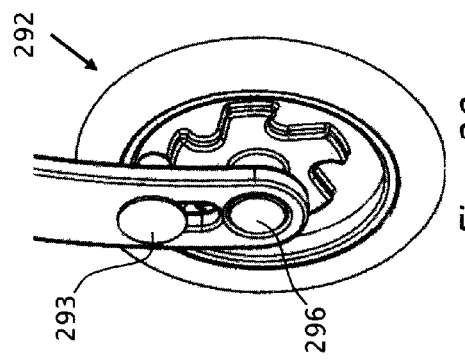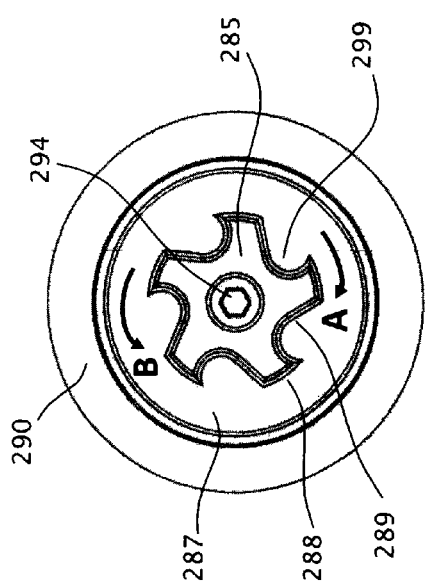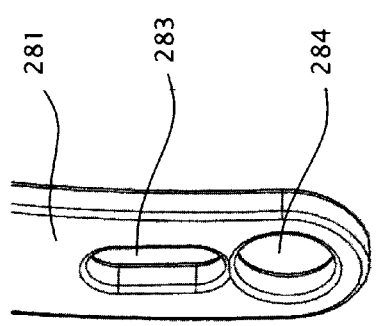

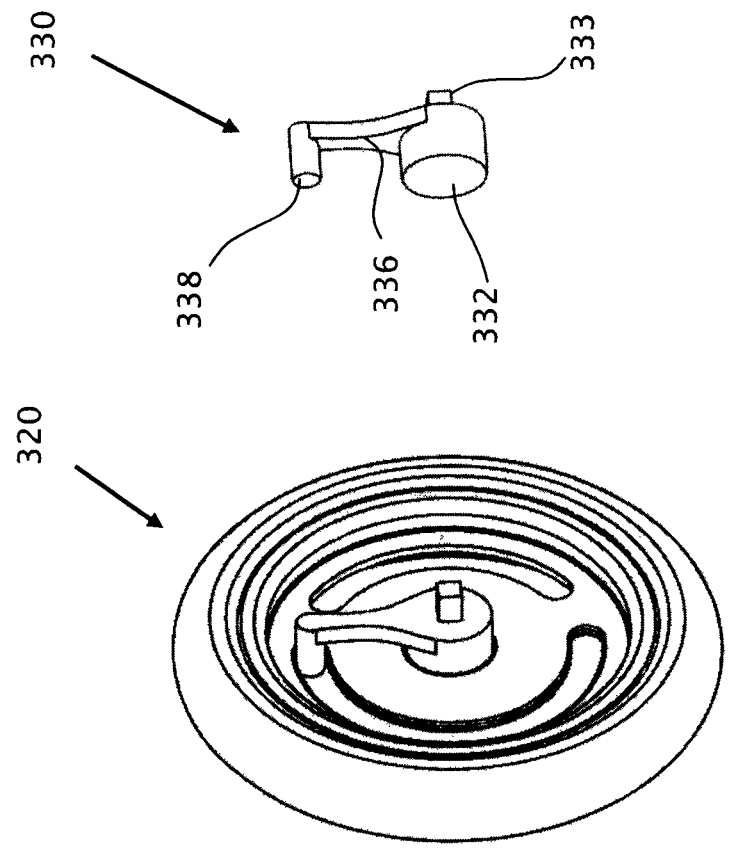
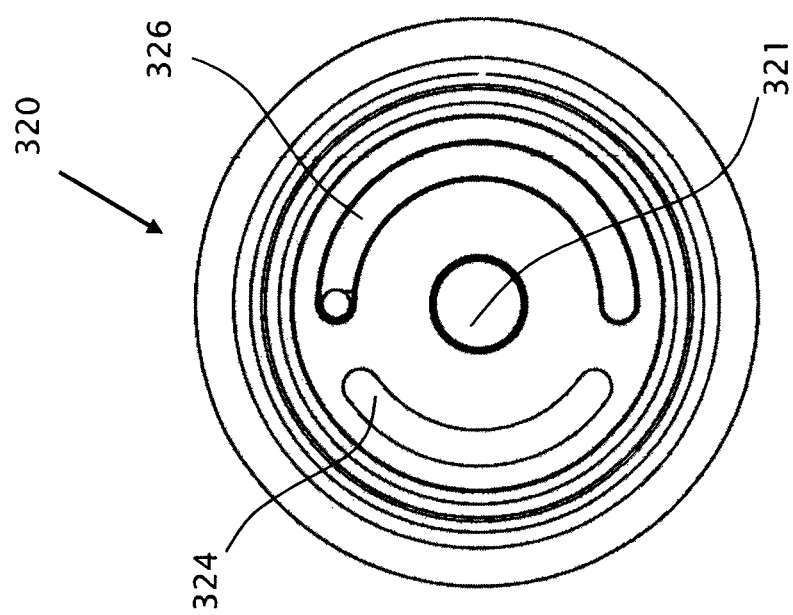
Fig. 29　　　Fig. 30　　　Fig. 31

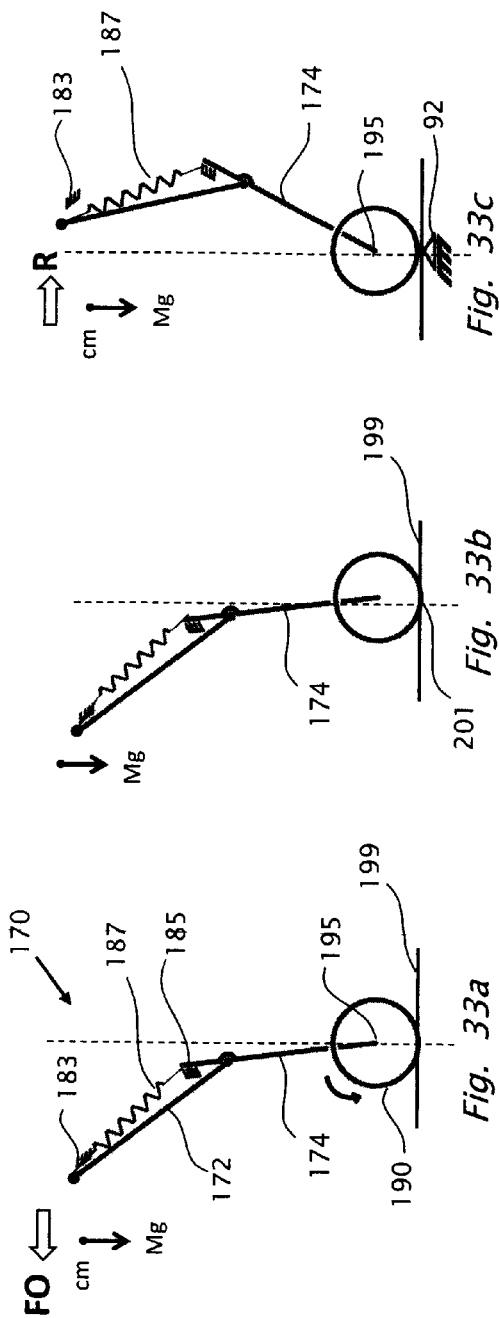
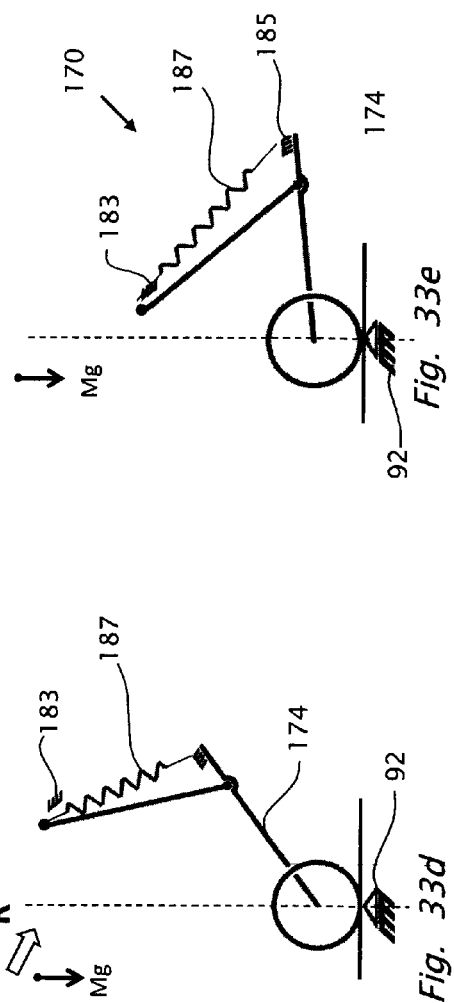
Fig. 33a, Fig. 33b, Fig. 33c, Fig. 33d, Fig. 33e

WALKING AID FOR DISABLED FOUR-LEGGED ANIMALS

FIELD OF THE INVENTION

This invention relates to walking aids for disabled four-legged animals, and more particularly, the present invention relates to mobile devices for injured or partially-immobilized animals such as dogs.

BACKGROUND OF THE INVENTION

Supportive mobile walking aids for disabled animals have been known in the art of veterinary medicine for many years. Many dogs and other household pets suffer from traumatic injury which causes an impairment or complete loss in use of their hind legs as a result of injury, illness, age, or obesity. Disabling medical conditions include inherited degenerative disorders, disc rupture and primary diseases of the nervous system. Unable to walk, romp about, or exercise, the animal often becomes lethargic, giving rise to additional health and care problems.

To address these concerns, many animal walking aids have been developed in the past. U.S. Pat. No. 7,549,398, issued to Mark Robinson et al, discloses a wheelchair for animals that is standardized yet adjustable. It further provides a wheelchair for animals that is adjustable in three dimensions, that is, height, width and length. This walking aid is unable to achieve a resting state by which a disabled animal is able to lie in a natural position.

U.S. Pat. No. 5,224,444, issued to Hill et al, discloses a walking aid for a four-legged animal. The walking aid includes a cradle attachable below the animal's hind quarters, and a support member pivotably attached to the cradle. A wheel arrangement is provided on the support member at its end remote from the cradle. Resiliency is provided for biasing the support member below the cradle. Due to the rotation of the wheels, the animal has to exert much force during a transition between a walking and collapsed condition.

There is a need, and it would be advantageous to have a walking aid for disabled four-legged animals that facilitates the natural lateral movement of the pelvis of the animal and that facilitates an easy and comfortable change from a walking state to a resting state and vice versa.

SUMMARY OF THE INVENTION

By way of introduction, the principal intentions of the present invention include proving a walking aid for a disabled four-legged animal, enabling the animal easy and comfortable change from a walking state to a resting state and vice versa. The walking aid of the present invention further enables the pelvis of the disabled animal to undergo natural walking motion including lateral movement of the pelvis.

A walking aid for a four-legged animal having disabled hind legs comprises an engagement member for engaging a body portion between fore legs and hind legs of said animal, a collapsible resting mechanism connected to said engagement member and to at least one wheel assembly in contact with an underlying surface, and a locking mechanism operatively connectable to said at least one wheel assembly in such a way that said at least one wheel is freely rotatable during forward motion of said walking aid but is rotationally immobilizable following rearward motion of said walking aid, wherein said resting mechanism is operational to facilitate movement from a walking state to a resting state or from a resting state to a walking state only when said at least one wheel assembly is rotationally immobilized.

As referred to herein, an "engagement member" is a member comprising or more elements for engaging the body portion from above or from below, and may be rigid, flexible, or expandable.

As referred to herein, a "wheel assembly" comprises one or more peripheral elements, whether made of a rigid material or a resilient material such as an elastomeric material, whether smooth or having a varying shape, each of which is contactable with the underlying surface, a shaft by which the wheel assembly is rotatable, and a central element connected to the peripheral element and to the shaft.

As referred to herein, a "locking mechanism" permits motion in one rotational direction and prevents motion in a second rotational direction opposite to the first direction, and comprises at least a rotatable member associated with a wheel assembly and an arresting element, e.g. follower means, for arresting motion of said rotatable member and of the corresponding wheel assembly in said second direction.

In one aspect, the rotatable member is connected to the shaft of the wheel assembly, and is preferably concentric therewith.

In one aspect, the rotatable member is a ratchet wheel and the arresting element is a pawl.

In one aspect, the rotatable member is a variably shaped hub formed with a plurality of alternating first and second camming surfaces along which a pin is slidable, each of said first surfaces defining a circle and each of said second surfaces being J-shaped, wherein said. pin is receivable in, and engageable by, a seat defined by an arcuate portion of one of said second surfaces following rearward motion of the walking aid, thereby preventing additional rotation of the wheel assembly.

In one aspect, the rotatable member is a peripheral element of the wheel assembly, e.g. a gear wheel.

In one aspect, the locking mechanism is a one-way self locking device such as one that is frictionally engaged.

In one aspect, the walking aid further comprises a wheel attachment formed with a circumferential groove in which a rotatable pin member is insertable for enabling limited rotation in the second rotational direction prior to being rotationally immobilized.

In one aspect, the resting mechanism is pivotably connected to the engagement member.

In one aspect, the resting mechanism comprises an upper link and a lower link which is pivotably connected to said upper link and to a wheel shaft, said lower link being pivotable in a second rotational direction opposite to a first rotational direction of the at least one wheel assembly which causes forward motion of the walking aid, upon application of an animal initiated force to facilitate movement from a walking state to a resting state.

In one aspect, the walking aid comprises identical right and left resting mechanisms, the lower link of each of which is pivotably connected to a corresponding wheel shaft.

In one aspect, the walking aid comprises identical right and left resting mechanisms, the lower link of each of which is pivotably connected to a single wheel shaft.

In one aspect, the walking aid further comprising a resilient biasing member connected to the lower link for assisting in returning the latter to its original position.

In one aspect, the upper link is pivotably connected to the engagement member.

In one aspect, the walking aid further comprises a support link pivotably connected to the engagement member and to the lower link.

In one aspect, a support bar for supporting the disabled hind legs of the animal is connected to right and left support links.

In one aspect, the engagement member is a support member for supporting the body portion of the animal.

In one aspect, the support member comprises front and rear sections and a pivoting unit connected to each of said front and rear sections by which the body portion of the animal is laterally pivotable. Alternatively, the support member comprises three or more sections and a pivoting unit connected to two adjacent sections In one aspect, the walking aid further comprises a harness assembly which is removably securable to the engagement member, e.g. to the front section.

In one aspect, the walking aid further comprises an extendable and retractable support belt for assisting the animal to overcome obstacles, said support belt when in a refracted state being retained in a housing which also comprises a pivot by which the support link is pivotably connected to the engagement member.

In one aspect, self rotating motion is performable when the at least one wheel assembly is rotationally immobilized.

In one aspect, the locking mechanism is settable to a relative motion resisting state or to a relative motion achievable state, depending on the animal initiated force.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIGS. 4a-4c illustrate the pivotable motion ability of a pivot mechanism for the walking aid shown in FIG. 1;

FIGS. 6a-6b illustrate another embodiment of a pivot mechanism, shown in top and exploded side perspective views, respectively;

FIGS. 7a-7c illustrate yet another embodiment of a pivot mechanism, wherein FIG. 7a is an assembled side perspective view FIG. 7b is an exploded side perspective view, and FIG. 7c is a top perspective view of an oval part thereof;

FIG. 8 is a side view of a tightening belt end portion of the harness of the walking aid shown in FIG. 1;

FIG. 9 is a perspective view of a connecting button, shown being securely disposed at a selected location on the body of frontal section of the walking aid shown in FIG. 1;

FIG. 10 is a side view of a tightening belt end portion shown in FIG. 8, tightened over the button shown in FIG. 9;

FIG. 11 is a side view of a retractable support belt, shown in a retracted state;

FIG. 12 is a side view of the support belt of FIG. 11, shown in an extended state;

FIG. 15 is a perspective view of a wheel of the walking aid shown in FIG. 1, showing a resting mechanism lower link and locking mechanism connected to a shaft thereof;

FIGS. 16a-16b are a side view of one embodiment of a locking mechanism, shown in rotation preventing and rotation enabling positions, respectively;

FIGS. 17a-17g are a side view of the resting mechanism of FIG. 13, shown in various collapsing stages, respectively;

FIG. 20 is a side view of another embodiment of a resting mechanism, shown in a walking state;

FIG. 21 is a side view of the resting mechanism of FIG. 20, shown in a resting state;

FIG. 25 is a side view of a wheel provided with a hub for use in conjunction with another embodiment of a locking mechanism;

FIG. 26 is a perspective view of the wheel of FIG. 25, showing the shaft when secured to the hub;

FIG. 27 is a perspective view from the side of a guide element;

FIG. 28 is a perspective view from the side of an assembled locking mechanism employing the hub of FIG. 25 and the guide element of FIG. 27;

FIG. 29 is a side view of a wheel attachment;

FIG. 30 is a perspective view of the wheel attachment of FIG. 29, shown when fully assembled;

FIG. 31 is a perspective view of a pin member used in conjunction with the wheel attachment of FIG. 29;

FIGS. 33a-33e are a schematic side view of a resting mechanism, shown in various collapsing stages, respectively;

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

Figure 1:
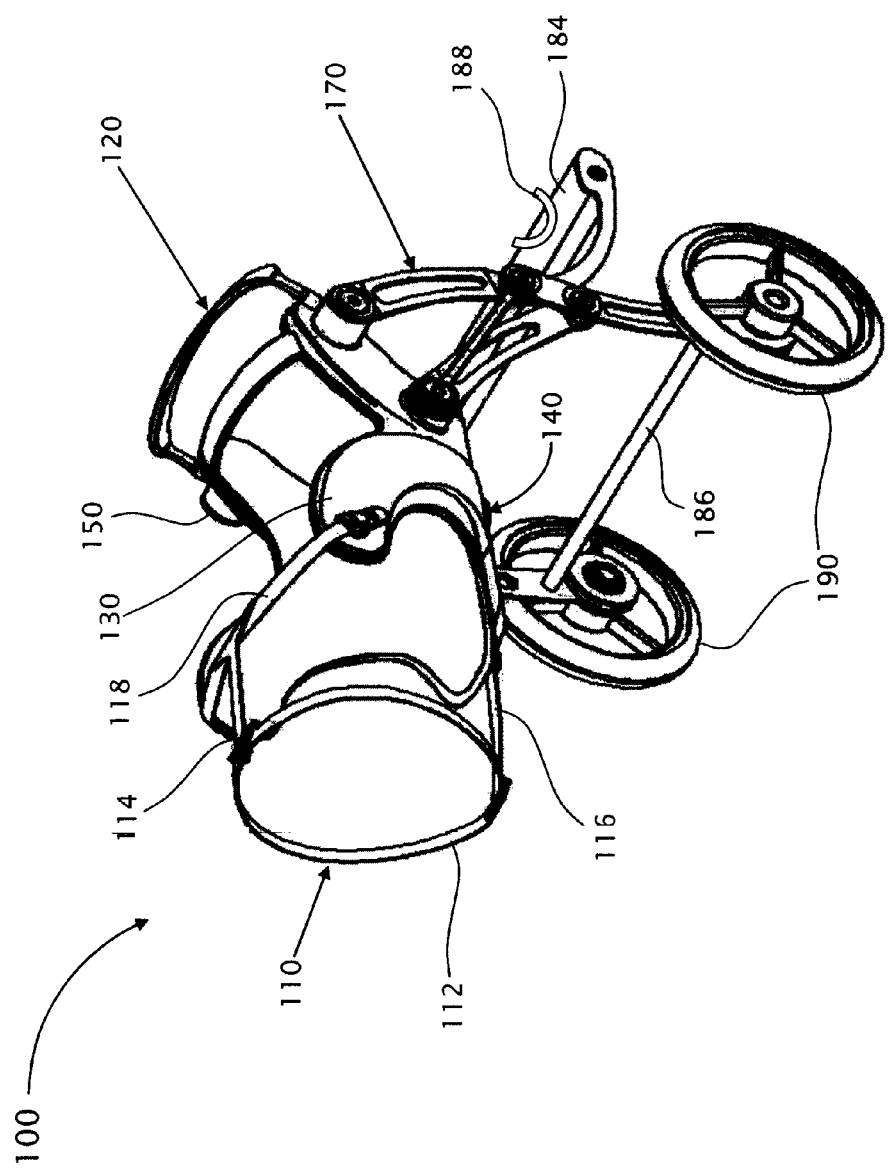
FIG. 1 is perspective view of a walking aid for a disabled four-legged animal, according to one embodiment of the present invention.
Figure 2:
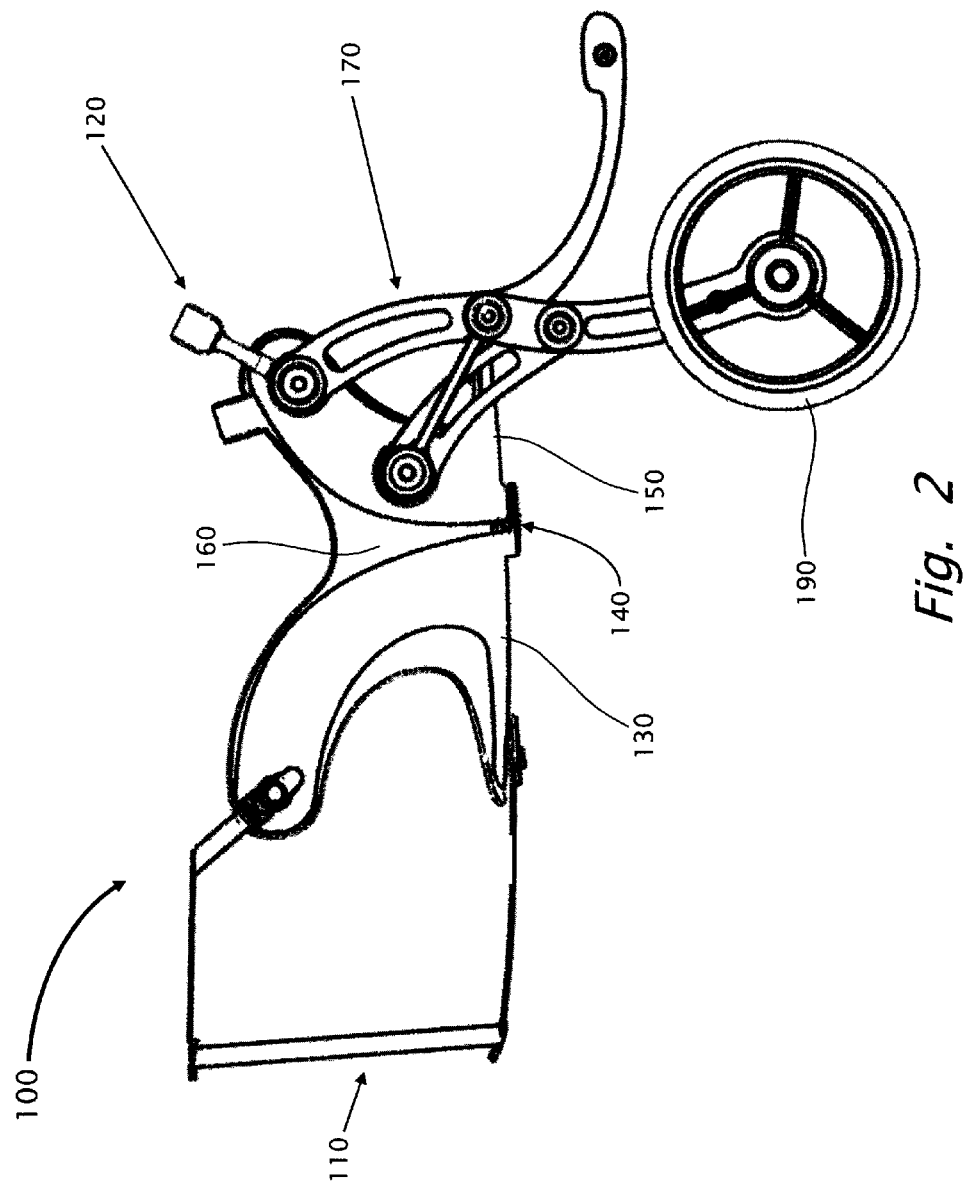
FIG. 2 is a side view of the walking aid shown in FIG. 1.
Figure 3:
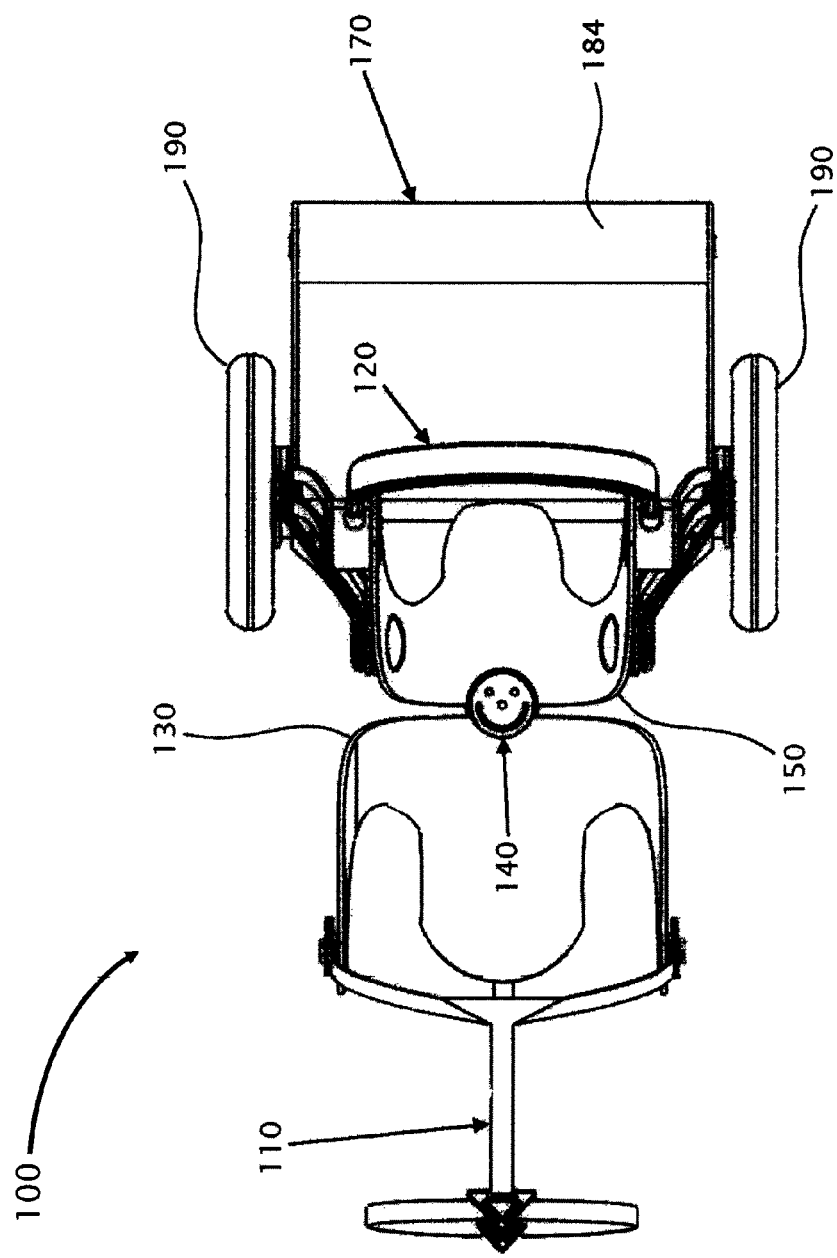
FIG. 3 is a top view of the walking aid shown in FIG. 1.

Reference is now made to the drawings. FIG. 1 is perspective view a walking aid 100 for a disabled four-legged animal, according to embodiments of the present invention. FIG. 2 is a side view of walking aid 100 and FIG. 3 is a top view of walking aid 100. Walking aid 100 includes a harness assembly 110, an optional support belt 120, a frontal section 130 and a rear section 150, a pivot mechanism 140, a collapsible resting mechanism 170 and wheels 190.

Frontal section 130 and rear section 150 are pivotably interconnected by pivot mechanism 140, and are combined to support a body portion of the animal between its fore legs and hind legs. When an animal is walking, a lateral motion of the animal's pelvis with respect to rest of the animal's body is formed, preferably maintained in a horizontal plane for optimal support of the spinal cord. Pivot mechanism 140 enables an animal using walking aid 100 to naturally perform such lateral motion.

The utility of the present invention will be appreciated by first referring to FIGS. 33a-e, which schematically illustrate the operations carried out by the disabled animal in order to facilitate movement of collapsible resting mechanism 170 from a walking state to a resting state.

FIG. 33a illustrates resting mechanism 170 in a walking state while wheel 190 is rotating and the walking aid is propelled in a forward direction FO, e.g. by forces applied by the front legs of the animal, by human applied forces, or even by the hind legs of the animal if they are not completely disabled. The center of mass cm of the animal, at which its mass Mg is concentrated, is located forwardly from resting mechanism 170. Resting mechanism 170 comprises upper link 172 pivotably connected to the engagement member of the walking aid, and lower link 174 pivotably connected to upper link 172 and to wheel shaft 195. Stoppers 183 and 185 are associated with rear section 150 (FIG. 2) and lower link 174, respectively, in order to limit excessive pivotable motion of the links, and a spring 187 is connected to links 172 and 174. Alternatively, spring 187 may be connected to rear section 150 and to lower link 174. In FIG. 33b, the animal ceases to move forwardly, and non-rotating wheel 190 contacts the underlying surface 199 at contact point 201.

The body of the animal then applies a rearwardly directed force R onto the walking aid such that the center of mass cm of the animal coincides with, or is slightly spaced from, contact point 201, as illustrated in FIG. 33c, and wheel 190 becomes rotationally immobilized by means of a locking mechanism 92, as will be described hereinafter. Although locking mechanism 92 is schematically illustrated as being external to the walking aid, it will be appreciated that the locking mechanism is one of the components of the walking aid, such as being pivotably connected to a wheel shaft. Wheel 190 consequently applies a reactive force, allowing lower link 174 to pivot with respect to wheel shaft 195 as a result of the rearwardly directed, animal initiated force R. Despite the application of force R, resting mechanism 170 remains in a relative motion resisting state, i.e. it is not caused to be collapsed and set to a resting state, due to the instantaneous angular disposition of the resultant animal derived force vector, which is based upon R and the mass of the animal Mg.

As force R continues to be applied and lower link 174 continues to be pivoted, the engagement member of the walking aid changes its disposition, resulting in a change in the angular disposition of force R, as shown in FIG. 33d. Resting mechanism 170 ceases to be in a relative motion resisting state due to an angular change in the resultant animal derived force vector, and is therefore caused to collapse, as shown in FIG. 33e. Spring 187 is extended to its fullest extent, being limited by one or more stoppers, e.g. pivot 177 (FIG. 17g). The animal is assisted by the spring power during a transition from the resting state to the walking state.

Figure 34:
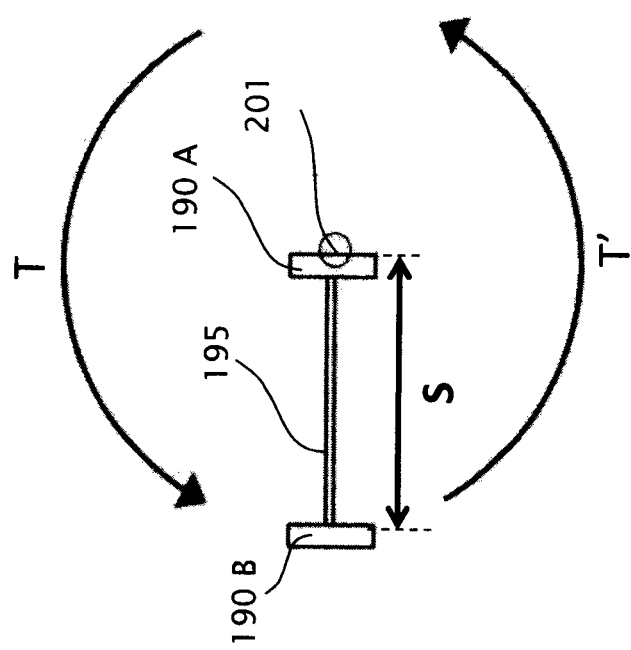
FIG. 34 is a schematic top view of a self rotating motion that is performable by the wheels of a walking aid when the resting mechanism is set to the stage shown in FIG. 17d.

As schematically illustrated in FIG. 34, the animal may desire to perform self rotating motion in one of two rotational directions T and T' after the wheels become rotationally immobilized. For example, when the animal body weight bears on wheel 190A, contact point 201 of wheel 190A with the underlying surface serves as a pivot point. Thus when the animal body performs self rotating motion, wheel 190B rotates about contact point 201 and length S of wheel shaft 195 defines the radius of rotation. Wheel shaft 195 is schematically shown to be a single shaft extending between wheels 190A and 190B but may comprise two separated collinear shafts for independently rotating each wheel.

Reference is also made to FIGS. 4a-4c, which illustrate the pivotable motion ability of pivot mechanism 140, wherein frontal section 130 is shown in different pivoted positions with respect to rear section 150. FIG. 4a depicts pivot mechanism 140 in a balanced state, wherein the longitudinal axis 135 frontal section 130 is substantially coincides with the longitudinal axis 155 of rear section 150. In the detailed portion of FIG. 4a, the gaps La and Ra formed between frontal section 130 and rear section 150, on the left and right sides of pivot mechanism 140, respectively, are substantially equal in size.

FIG. 4b depicts pivot mechanism 140, wherein longitudinal axis 135 frontal section 130 is forms an angle α to the right (in FIG. 4b) with longitudinal axis 155 of rear section 150. In the detailed portion of FIG. 4b, the gaps Lb formed between frontal section 130 and rear section 150 on the left side of pivot mechanism 140, is substantially larger than the gap Rb formed between frontal section 130 and rear section 150 on the right side of pivot mechanism 140.

Figure 5:
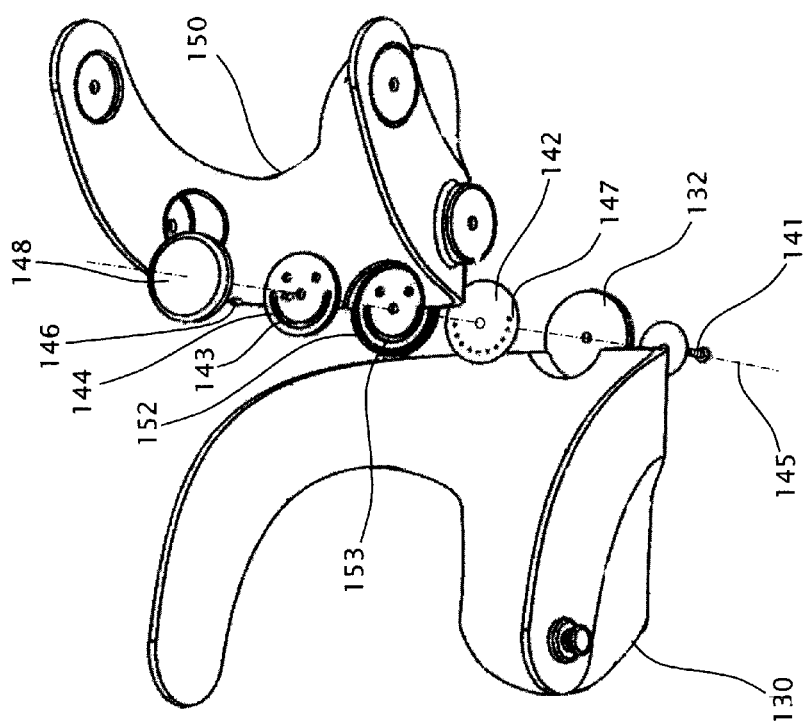
FIG. 5 is an exploded top perspective view of a frontal section, a rear section and one embodiment of a pivot mechanism, of the walking aid shown in FIG. 1.

Reference is also made to FIG. 5, which shows an exploded top perspective view of frontal section 130, rear section 150 and pivot mechanism 140. Frontal section 130 includes on the back side a fitted disc like basin 132. Rear section 150 includes on the front side a fitted disc like basin 152. Both disc like basin 132 and disc like basin 152 are fitted to accommodate generally disc like shaped pivot mechanism 140.

Pivot mechanism 140 includes, for example, a rounded part 142 that is securely attached to basin 132. Pivot mechanism 140 further includes rounded part 144 that is securely attached to basin 152. A rounded arched groove 143 is formed in rounded part 144 such that arched groove 143 is concentric with pivotable axis 145 of pivot mechanism 140. A rounded arched groove 153 is also formed in basin 152 such that arched groove 153 coincides with arched groove 143.

A series of threaded holes 147 are formed in rounded part 142 such that threaded holes 147 are aligned on an arch that is concentric with pivotable axis 145 of pivot mechanism 140, and aligned with arched groove 143. Two threaded pins 146 are screwed into selective threaded holes 147 such that threaded pins 146 serve as stoppers to delimit the pivotable motion of pivot mechanism 140.

Referring now to FIG. 4b, when pin 146R reaches end 149R of groove 143, the pivoting motion to the right is stopped. Similarly, with reference to FIG. 4c, when pin 146L reaches end 149L of groove 143, the pivoting motion to the left is stopped.

Pivot mechanism 140 further includes a bolt 141 that is inserted through a fitted central hole in basin 132, rounded part 142, basin 152 and rounded part 144, facilitating a motional axis that coincides with axis 145.

Optionally, pivot mechanism 140 further includes a cover 148 that protects pivot mechanism 140, wherein cover 148 is optionally made of clear material.

It should be noted that the hereinabove described pivot mechanism 140 is given by way of example only, and other pivotable mechanisms may be embodied within the scope of the present invention.

Referring now to FIGS. 6a and 6b, another example of a pivot mechanism 240 is shown. Pivot mechanism 240 includes a bolt 242 and optionally a piped part 244 through which bolt 242 is inserted and secured from the other end of piped part 244. Frontal section 230 of a walking aid for a disabled four-legged animal includes on the back side a fitted disc like basin 232. Rear section 250 includes on the front side a fitted disc like basin 252. Both disc like basin 232 and disc like basin 252 are fitted in shape and size.

When assembled (see FIG. 6a), piped part 244 is first inserted through a fitted central hole in both basin 232 and basin 252. Bolt 242, having a head wider than the hollow space inside piped part 244, is inserted and secured from the other end of piped part 244, typically by a nut having an external dimension wider than the hollow space inside piped part 244.

Referring now to FIGS. 7a-7c, yet another example of a pivot mechanism 340 is shown. Pivot mechanism 340 includes an oval part 342. Frontal section 330 of a walking aid for a disabled four-legged animal includes on the back side a fitted disc like basin 332. Rear section 350 includes on the front side a fitted disc like basin 352. Both disc like basin 332 and disc like basin 352 are fitted in shape and size.

A rounded arched groove 333 is formed in basin 332 such that arched groove 333 is concentric with a first pivotable axis of pivot mechanism 340. A rounded arched groove 353 is also formed in basin 352 such that arched groove 353 is concentric with a second pivotable axis of pivot mechanism 340.

Two series of threaded holes 347 are formed in oval part 342 on both sides. A of first series of threaded holes 347 are disposed on an arch that is concentric with the first pivotable axis of pivot mechanism 340, and is aligned with arched groove 333. A of second series of threaded holes 347 are disposed on an arch that is concentric with the second pivotable axis of pivot mechanism 340, and is aligned with arched groove 353.

Two threaded pins 346 are screwed into selective threaded holes 347 such that threaded pins 346 serve as stoppers to delimit the pivotable motion of both axes of pivot mechanism 340.

Harness assembly 110 (see FIG. 1) includes a body harness 112, a tightening belt 118, and a lower belt 116 and an upper belt 114 which pair of belts (114 and 116) securely attach tightening belt 118 to body harness 112. Harness assembly 110 is removably secured to frontal section 130. Reference is also made to FIG. 8, which shows the end portion of tightening belt 118. A connector 117 is securely disposed at the end of tightening belt 118. Reference is also made to FIG. 9, which shows a connecting button 134 is securely disposed at a designated location on the body of frontal section 130. Button 134 includes a narrow part 136 and a wider part 137, wherein narrow part 136 is proximal to the external surface of frontal section 130 and wider part 137 is distal from the external surface of frontal section 130.

A fitted opening 119 is formed in connector 117, wherein fitted opening 119 includes a narrow part 19b and a wider part 19a. When harnessing a dog onto walking aid 100, connector 117 is place over button 134, wherein wider part 19a of fitted opening 119 is place over wider part 137 of button 134, and wherein narrow part 19b of fitted opening 119 is then tightened over narrow part 136 of button 134. The tightened connector 117 over button 134 is shown in FIG. 10.

It should be noted that the hereinabove described connecting mechanism, for operatively connecting harness assembly 110 is removably secured to frontal section 130, is given by way of example only, and other commonly used connecting mechanisms may be embodied within the scope of the present invention.

Reference is now made to FIGS. 11 and 10, which illustrate an optional retractable support belt 120, wherein support belt 120 is shown in FIG. 11 in a retracted state and in FIG. 12 in a pulled state. Retractable support belt 120 is used by the animal keeper to help the animal overcome obstacles such as stairs.

Figures 13, 14:
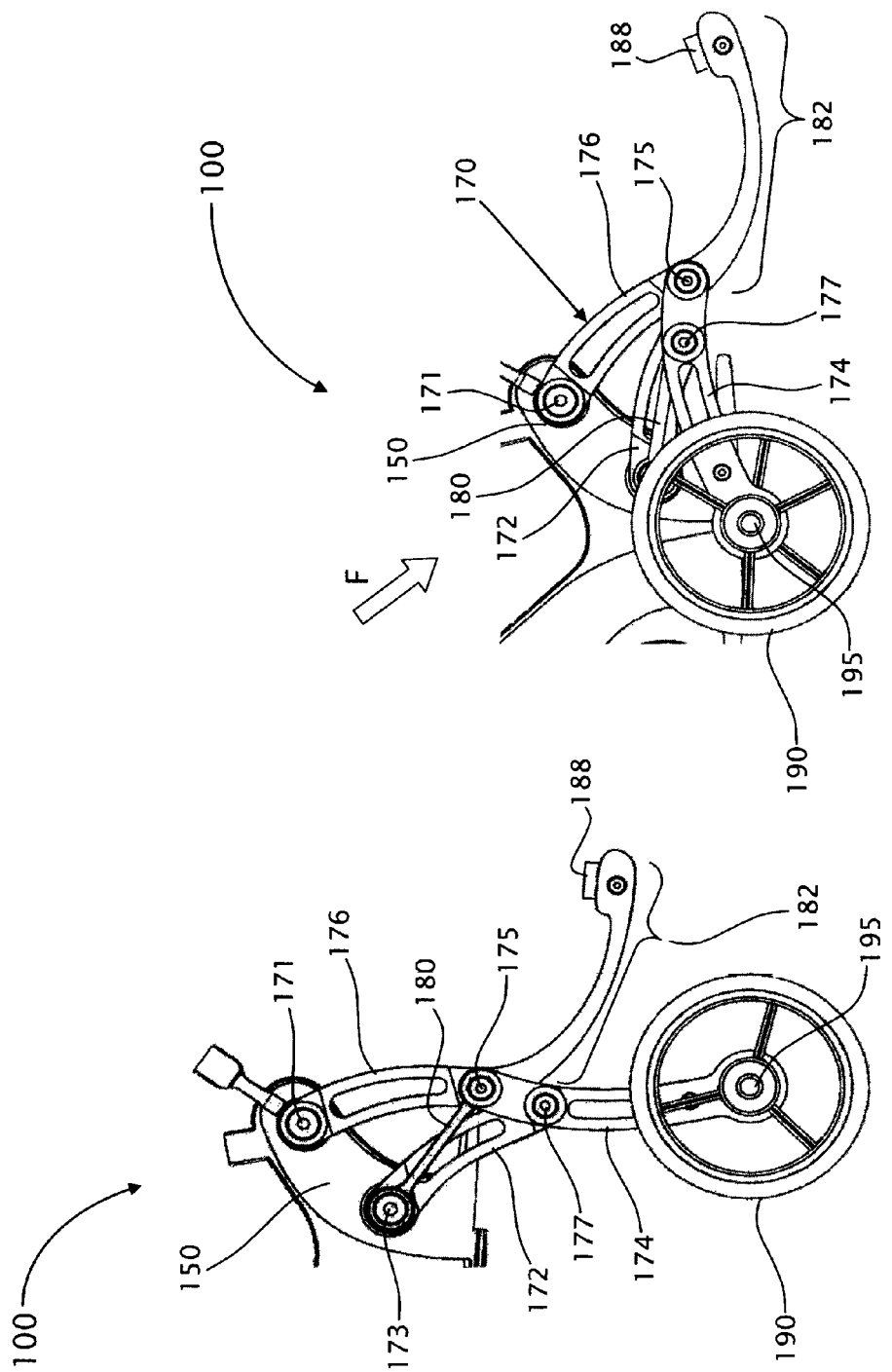
FIG. 13 is a side view of a collapsible resting mechanism, according to one embodiment of the present invention, shown in a walking state.
FIG. 14 is a side view of the resting mechanism of FIG. 13, shown in a resting state.

Reference is now made to FIGS. 13 and 14, which illustrate a collapsible resting mechanism 170, wherein collapsible resting mechanism 170 is shown in FIG. 13 in a walking state and in FIG. 14 in a resting state. Collapsible resting mechanism 170 allows the disposition of an impaired animal to be easily and comfortably changed from a walking state to a resting state, and vice versa.

Collapsible resting mechanism 170 includes a pair of upper links 172, a pair of lower links 174, a pair of support links 176, a pair of biasing members 180 and a wheel arrangement having a pair or more of wheels 190. Each pair will now be described as being a single element, wherein the description applies to each element of each pair.

Lower link 174 is pivotably attached, on a first end, to shaft 195 of wheel 190 and is pivotably attached, on a second end, to a pivot 175, disposed generally at a predesigned central location on support link 176.

Upper link 172 is pivotably attached, on a first end, to pivot 177, disposed generally at a predesigned central location on lower link 174, the location being more proximal to pivot 175 than to shaft 195 of wheel 190. Upper link 172 is also pivotably attached, on a second end, to a pivot 173, disposed at a predesigned location on rear section 150.

Support link 176 is pivotably attached, on a first end, to a pivot 171, disposed at a predesigned location on rear section 150. It should be noted that pivot 171 is disposed at a location on rear section 150, which location being higher and more rearwardly located with respect to pivot 173.

Biasing member 180, which may be an elastic band, such as a rubber band, is attached, on a first end, to a pivot 173, and on a second end, to a pivot 175. Alternatively, the biasing member may be a spring such as a helical coiled spring, or any other elastic element.

Each wheel 190 is facilitated to rotate freely together with shaft 195. Each wheel 190 includes a locking mechanism for halting the rotational motion, when wheel 190 moves backward. The halting mechanism of wheel 190 is a key operational feature of collapsible resting mechanism 170. Reference is made to FIG. 15, which illustrates a wheel 190 assembled onto the lower end of lower link 174, and including locking mechanism assembly 192, which is given by way of example only, with no limitation on using other commonly used wheel locking mechanisms.

Reference is also made to FIGS. 16a and 16b, which illustrate an exemplary wheel locking mechanism. In this example, locking mechanism assembly 192 is a ratchet type locking mechanism. The locking mechanism includes a cogwheel 194 having saw-type teeth and a matching pivotable tooth 196. When wheel 190 rotates such that walking aid 100 moves forwardly, cogwheel 194 moves freely in direction 198, as depicted in FIG. 16b, whereas tooth 196 enables such free rotation. When wheel 190 attempts to rotate such that walking aid 100 moves backward, cogwheel 194 tries to rotate in a direction opposite to direction 198, as depicted in FIG. 16a, but tooth 196 blocks the rotation attempt and thereby locks wheel 190.

It will be appreciated that many other types of locking mechanisms may be employed.

For example, locking mechanism 292 illustrated in FIGS. 25-28 may be employed.

Wheel 290 shown in FIGS. 25 and 26 is provided with a variably shaped hub 285 that is fixedly attached to the center of a solid inner wall 287 of the wheel to define a recess as shown, or is fixedly attached to the wheel by any other suitable means well known to those skilled in the art. Hub 285 is formed with a plurality of alternating camming surfaces 288 and 289 along which a pin 293 (FIG. 28) is slidable. Spaced arcuate, outwardly located camming surfaces 288 define a circle. Each of the spaced concave camming surfaces 289 extends between first and second surfaces 288, and may be J-shaped such that the straight portion thereof which is contactable by pin 293 when wheel 290 is rotating in a forward rotational direction A is spaced from an adjacent surface 288 by approximately 90 degrees. An axle 296 is fitted in a central recessed portion 294 of hub 285.

Elongated guide member 281, which may extend downwardly from the rear section, is illustrated in FIGS. 27 and 28. Guide member 281 is formed with an upper elliptical aperture 284 and a lower circular aperture 284. Pin 293 is inserted within, and slidable along, upper aperture 283 while contacting the camming surfaces of hub 285. Axle 296 is rotatably mounted to lower aperture 284.

When wheel 290 is rotated in forward rotational direction A, pin 293 slides along outer camming surfaces 288. After being released from an outer camming surface 288, pin 293 sequentially contacts the straight portion of the adjacent inner camming surface 289, is released therefrom, and is displaced to the next outer camming surface 288. However, when wheel 290 is rotated in rearward rotational direction B, pin 293 is received in, and engaged by, the seat 299 defined by the arcuate portion of inner camming surface 289 and the outer camming surface 288 from which pin 293 was released after wheel 290 was rotated in rearward rotational direction B. Pin slides along upper aperture 283 towards axle 296 when received in seat 299, preventing additional rotation of wheel 290.

FIGS. 29 and 30 illustrate circular wheel attachment 320 that may be used in conjunction with locking mechanism assembly 192 or 292, or with any other selected locking mechanism assembly. Wheel attachment 320 is formed with circular aperture 321 and two circumferentially spaced circumferential grooves 324 and 326, which are formed at the same radial spacing from circular aperture 321. Groove 326 may be circumferentially longer than groove 324.

A pin member 330 shown in FIG. 31 is operational in conjunction with wheel attachment 320, in order to enable limited wheel rotation in the rearward direction prior to being rotationally immobilized. Pin member 330 comprises central tubular element 332 that is rotatably mounted in circular aperture 321. Engagement element 333 protrudes axially inwardly from tubular element 332, and is adapted to be connected to the wheel shaft of one of the locking mechanisms, allowing tubular element 332 and the wheel shaft to be coaxial. An arm 336 extends radially from the periphery of tubular element 332 to an axially outwardly extending pin 338. Arm 336 is suitably sized to allow pin 338 to be inserted within one of the grooves 324 and 326.

When engagement element 333 is connected to the wheel shaft, the walking aid wheel, wheel attachment, wheel shaft and pin assembly all rotate in unison when being rotated in a forward direction without relative motion therebetween. However, when the walking aid wheel is rotated in a rearward direction and the wheel shaft is rotationally immobilized, wheel attachment 320 is allowed to be rotated rearwardly a circumferential distance of approximately half its circumference until the end of the groove contacts pin 338. The rearward circumferential distance varies, depending on whether pin 338 is inserted in groove 324 or 326, or may be set to any other desired value.

The wheel attachment affords the animal a greater range of motion. Since a wheel attachment rotates a predetermined circumferential distance after the walking aid wheel becomes rotationally immobilized, the two wheel attachments are able to rotate on top of the underlying surface while the animal initiates self rotating motion.

Figure 35:
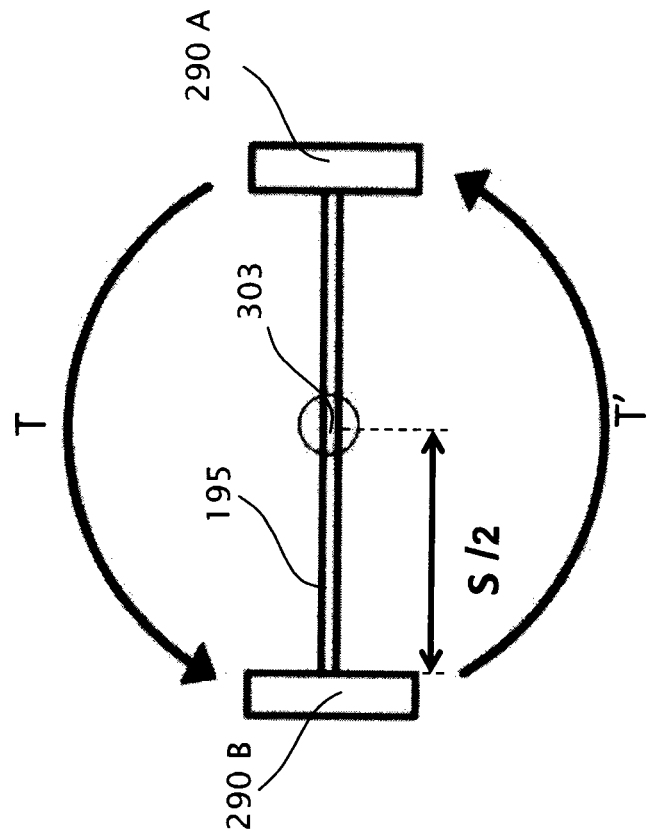
FIG. 35 is a schematic top view of a self rotating motion that is performable by means of the wheel attachment of FIG. 30.

As schematically illustrated in FIG. 35, the two wheel attachments 290A and 290B rotate about the center 303 of shaft 195 when the animal body initiates self rotating motion in rotational direction T or T' such that the radius of rotation is half the length of shaft 195. This radius of rotation is made possible when the circumferential groove of the wheel attachment subtends an angle of 180 degrees. If it is desired that the animal initiates self rotating motion with a different radius of rotation, the wheel attachment is simply replaced with another wheel attachment which has a circumferential groove of a selected angular length.

Referring now to FIGS. 17a-17g, collapsible resting mechanism 170 is shown in various collapsing stages. Reference is also made to FIGS. 13, 14, and 33a-33e.

Resting mechanism 170 is shown in a walking state in FIG. 17a and in a standing state in FIG. 17b, corresponding to the positions shown in FIGS. 33a and 33b, respectively.

A rearwardly directed, animal initiated force R (FIG. 33c) is then applied, initiating a process at the end of which walking aid 100 will achieve a resting state (see FIG. 14). As shown in FIG. 17c, resting mechanism 170 remains in a relative motion resisting state when in the standing state, due to the instantaneous angular disposition of the resultant animal derived force vector F, e.g. 20 degrees with respect to a vertical plane, which is based upon force R and the downwardly directed weight force Mg. Resultant force vector F extends obliquely from pivot 17 due to the contact of the latter with the engagement member of the walking aid.

While force R continues to be applied, wheels 190 move backwardly to activate locking mechanism 92, causing wheels 190 to be rotationally immobilized, a state that is depicted in FIGS. 17d and 33c. Also, the instantaneous angular disposition of resultant vector F is caused to be rotated about pivot 173 in a counterclockwise direction, with respect to the illustrated orientation of wheel 190, until it crosses contact point 201 with the underlying surface, as shown in FIG. 17e. After resultant vector F crosses contact point 201, for example to an instantaneous angular disposition of 30 degrees with respect to a vertical plane, resting mechanism 170 is released from the relative motion resisting state and relative movement between upper link 172 and lower link 174 is permitted.

It will be appreciated that the ability to be released from the relative motion resisting state is independent of the animal weight, and is dependent only on the configuration of the walking aid engagement member and of the resting mechanism, and on the magnitude of rearwardly directed force R.

While resultant force vector F is sustained, overcoming the force embedded in the biasing member, e.g. biasing member 180 shown in FIG. 13 or spring 187 shown in FIG. 33e, resting mechanism 170 begins to collapse, as shown in FIG. 17f. The first end of lower link 174 moves pivotably about shaft 195 while the second end of lower link 174 moves backwardly and downwardly, pushing pivots 175 and 177 in the same direction. Eventually, a portion of resultant force vector F is stored in the biasing member while the biasing member expands and the distance between pivot 173 and pivot 175 increases until the resting state is achieved, as shown in FIG. 17g.

An enforcement bar 186 (see FIGS. 1 and 15) may be securely disposed between lower links 174 to reinforce the structure of walking aid 100.

It should be noted that the biasing member 180 may be selected according to the weight of the animal, and may be adjustable.

When the animal wishes to walk again, the animal may push upwardly with the front legs while being assisted with the release of the force stored in biasing member 180, walking aid 100 returns to a walking state in a reverse process.

In embodiments of the present invention, wherein support link 176 includes portion 182, the second ends of support links 176 are interconnected be a support bar 184 (see FIGS. 1 and 3). Support bar 184 serves as a support for the impaired rear legs of the animal. Optionally, tightening elements 188 are securely attached to support bar 184 and serve to tie the impaired rear legs of the animal.

Figure 18:
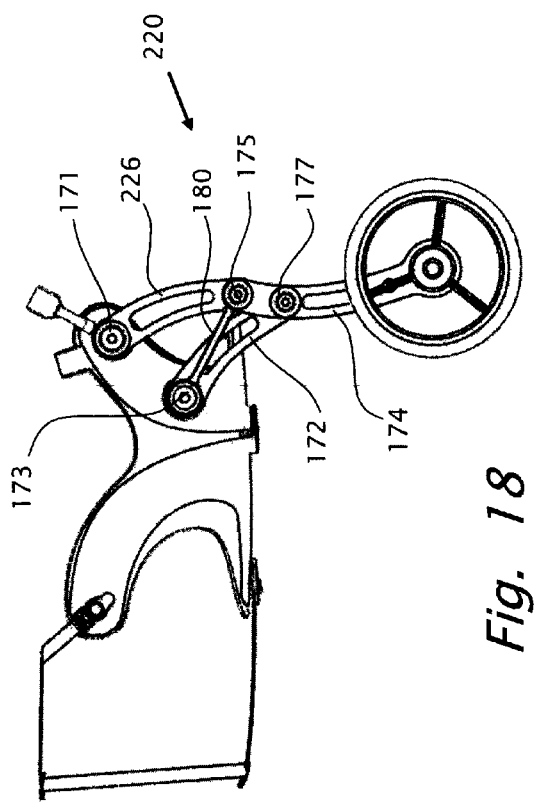
FIG. 18 is a side view of another embodiment of a resting mechanism, shown in a walking state.
Figure 19:
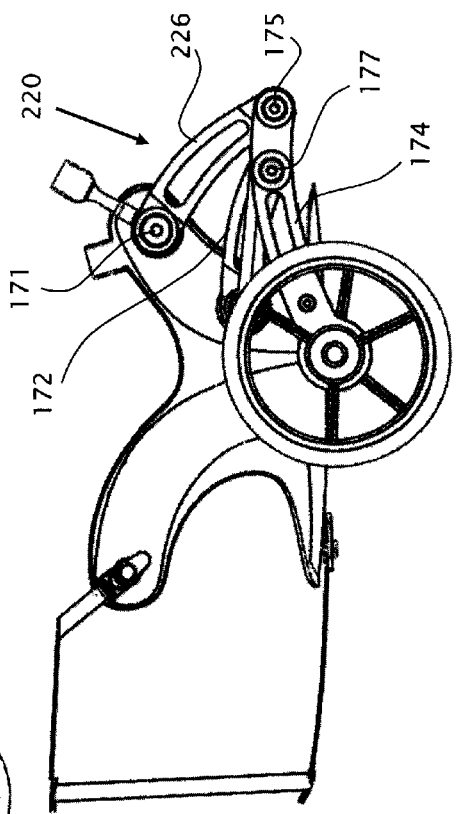
FIG. 19 is a side view of the resting mechanism of FIG. 18, shown in a resting state.

In embodiments of the present invention, as shown in FIGS. 18 and 19, the support bar is eliminated. Resting mechanism 220 is identical to resting mechanism 170 shown in FIGS. 13-14, with the exception that support link 226 pivotably connected to pivots 171 and 175 terminates at pivot 175.

As shown in FIGS. 20 and 21, a resting mechanism 230 may comprise a stationary arcuate upper link 232 connected to rear section 150, a lower link 234 pivotably connected to upper link 232 by means of pivot 237, and a helical extension spring 236 for facilitating movement from the resting state to the walking state. The upper end of helical spring 236 is mounted to protrusion 233, e.g. triangularly shaped, which rearwardly extends from an upper region of upper link 232. The lower end of helical spring 236 is mounted to protrusion 239, e.g. triangularly shaped, which outwardly extends from a terminal region of upper link 232 to the side of pivot 237. After wheel 190 becomes immobilized, lower link 234 pivots in a clockwise direction about pivot 237 while spring 236 becomes extended until rear section 150 is lowered and resting mechanism 230 achieves a resting state. One or more stoppers (not shown) may be employed to restrict movement of lower link 234.

Figure 22:
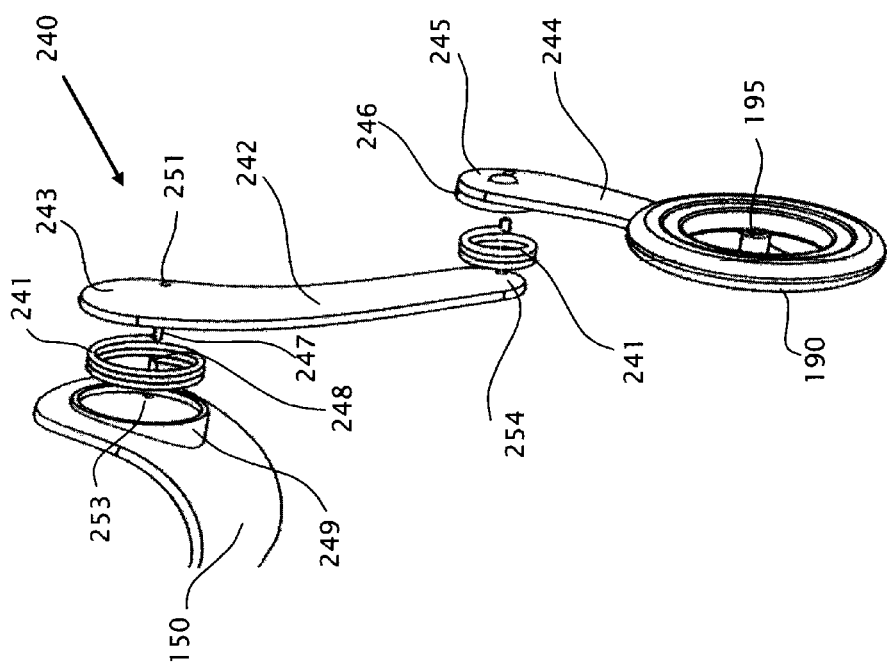
FIG. 22 is a perspective exploded view of another embodiment of a resting mechanism.

Alternatively, as shown in FIG. 22, resting mechanism 240 comprises an upper link 242 and a lower link 244 that are both pivotably attached and biased by means of a corresponding thin torsion spring 241 which is seated in a thin cavity and which attempts to return the links to their original position. Extending axially, i.e. substantially parallel to shaft 195 of wheel 190, from uppermost region 245 of lower link 244 is annular cavity wall 246. An annular cavity wall 249 extends axially from a region of rear section 150 that corresponds to the uppermost region 243 of upper link 242. A first end 247 of spring 241 is secured within an aperture 251 formed in upper link 242 and a second end thereof is secured within an aperture 253 formed in rear section 150 and interiorly to cavity wall 249. Likewise the second spring 241 is secured within an aperture formed interiorly to cavity wall 246 and within an aperture formed in the lowermost region 254 of upper link 242.

Figure 23:
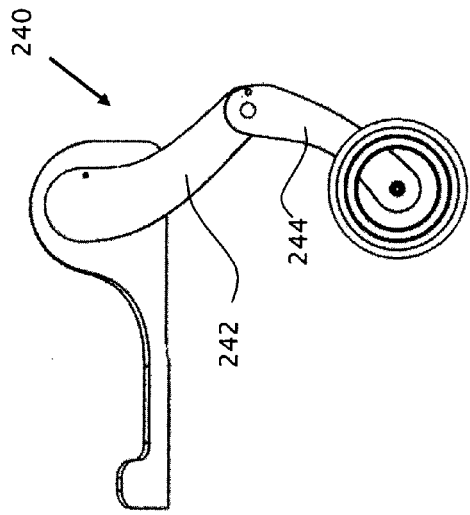
FIG. 23 is a side view of the resting mechanism of FIG. 22, shown in a walking state.
Figure 24:
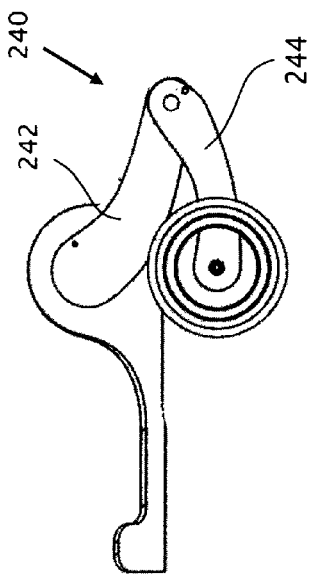
FIG. 24 is a side view of the resting mechanism of FIG. 22, shown in a resting state.

Resting mechanism 240 is illustrated in FIG. 23 in a walking state and in FIG. 24 in a resting state, after lower link 244 has pivoted in a clockwise direction and upper link 242 has pivoted in a counterclockwise direction, with respect to the illustrated orientation.

Figure 36:
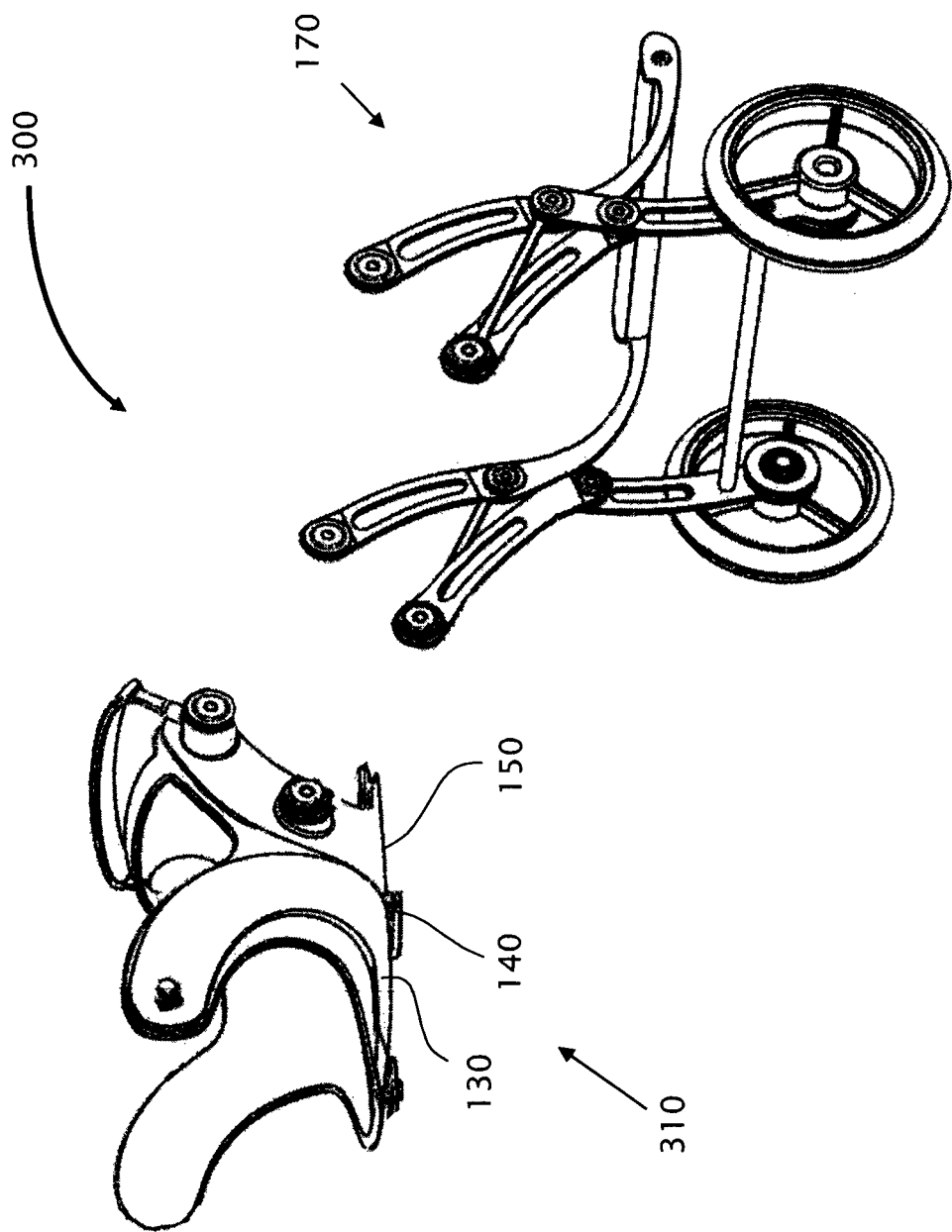
FIG. 36 is a perspective view of a walking aid, according to another embodiment of the invention.

With reference to FIG. 36, a walking aid 300 is illustrated which comprises a resting mechanism 170 which is separable from engagement member 310. The pivots of resting mechanism 170 may be connected to engagement member 310 by any means well known to those skilled in the art. Engagement member 310 may comprise front section 130, rear section 150, and pivot mechanism 140 connected to both front section 130 and rear section 150.

Figure 32:
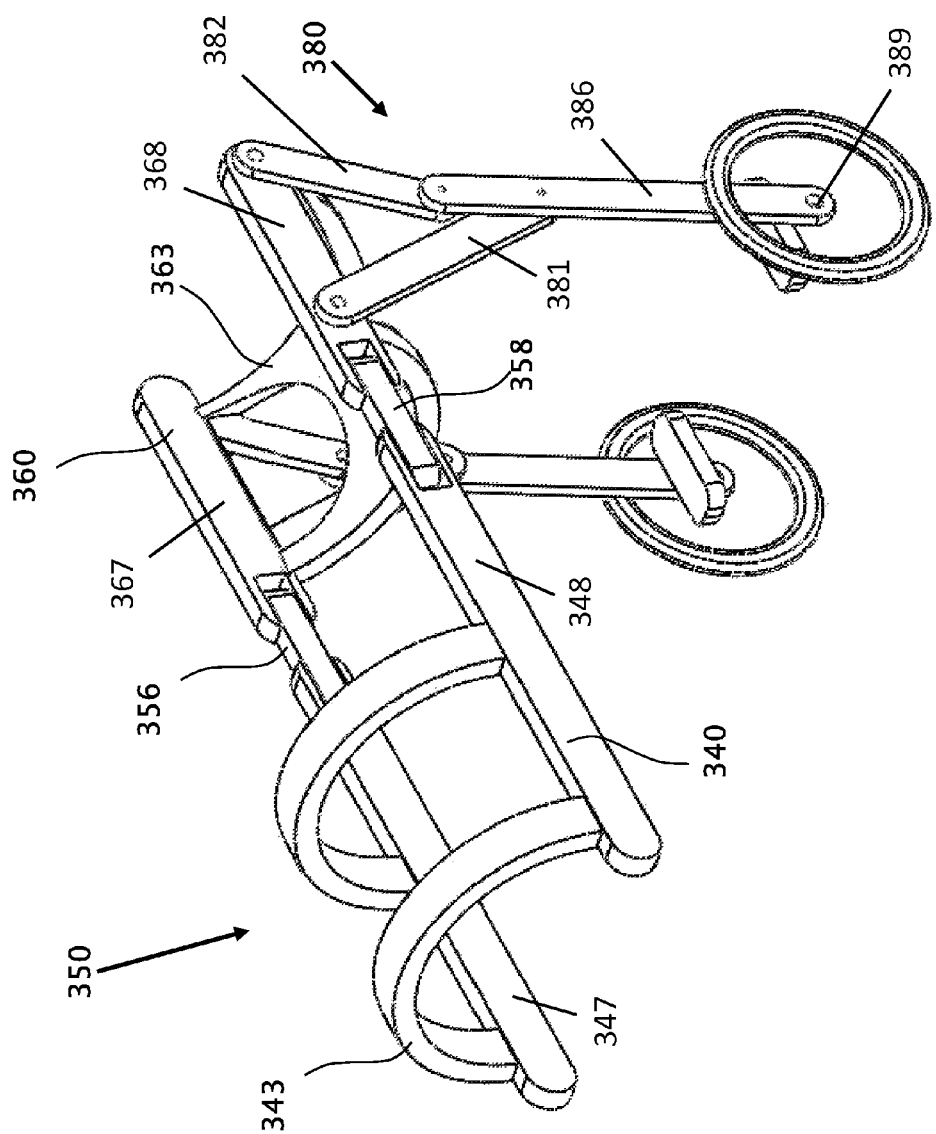
FIG. 32 is a perspective view of a walking aid, according to another embodiment of the invention.

FIG. 32 illustrates a walking aid 350, according to another embodiment of the present invention. Walking aid 350 comprises front section 340 and rear section 360 that both comprise right and left elongated side elements. A concave, partially removed support element 363 for supporting the disabled hind legs of an animal extends between the right 367 and left 368 side elements of rear section 360, and two longitudinally spaced convex elements 343 for accommodating the intermediate body portion of the animal extend between the right 347 and left 348 side elements of front section 340. Each of front section 340 and rear section 360 is laterally pivotable by means of elongated right and left connecting elements 356 and 358, allowing the spinal cord of the animal to remain straight and to retain its equilibrium. Each of the front 347 and rear 367 right side elements are pivotably connected to connecting element 356 by a corresponding vertically oriented pin, and each of the front 348 and rear 368 left side elements are pivotably connected to connecting element 358 by a corresponding vertically oriented pin. Each of the identical right and left resting mechanisms 380 comprises upper links 381 and 382 and lower link 386. Upper links 381 and 382 are pivotably connected to a side element of rear section 360 and lower link 386 is pivotably connected to wheel shaft 389 and to each of the upper links.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A walking aid for a four-legged animal having disabled hind legs, comprising:
   a) an engagement member for engaging a body portion between fore legs and hind legs of said animal, said engagement member configured to maintain the pelvis of said animal in a substantially horizontal plane;
   b) a wheel mounted locking mechanism comprising a rotatable member directly mounted on a wheel shaft of at least one wheel assembly that is in contact with an underlying surface, and an arresting element for arresting motion of said rotatable member in such a way that said at least one wheel assembly is freely rotatable during forward motion of said walking aid but is rotationally immobilized following rearward motion of said walking aid; and
   c) a collapsible resting mechanism connected to said engagement member and to said at least one wheel assembly, said resting mechanism comprising:
      i) an upper link pivotably connected to said engagement member; and
      ii) a lower link, said lower link being pivotably connected to said upper link and to the wheel shaft, and being pivotable in a second rotational direction opposite to a first rotational direction of the at least one wheel assembly that causes the forward motion of the walking aid, following application of an animal initiated force to facilitate movement from a walking state to a resting state;

wherein said resting mechanism is operational to facilitate movement from the walking state to the resting state or from the resting state to the walking state only when said at least one wheel assembly is rotationally immobilized, and wherein said resting mechanism is configured such that, when said at least one wheel assembly is rotationally immobilized, said upper link is oriented forwardly in a direction from said lower link to said engagement member, and said lower link is oriented rearwardly in a direction from the wheel shaft to said upper link, said rearward orientation of said lower link facilitating movement from the walking state to the resting state following application of a rearwardly directed force initiated by said engaged body portion of said animal, to produce a movement transmitted by said upper link and causing said lower link to pivot rearwardly, and in response causing said upper link to pivot forwardly until said resting mechanism becomes fully collapsed, and wherein said resting mechanism is operational to facilitate movement from the resting state to the walking state upon application of a forwardly directed force initiated by said engaged body portion of said animal.

2. The walking aid according to claim 1, which comprises identical right and left resting mechanisms, the lower link of each of which is pivotally connected to the wheel shaft.

3. The walking aid according to claim 1, wherein self rotating motion is performable thereby when the at least one wheel assembly is rotationally immobilized.

4. The walking aid according to claim 1, wherein the locking mechanism is settable to a relative motion resisting state or to a relative motion achievable state, depending on the animal initiated force.

5. The walking aid according to claim 1, wherein the locking mechanism comprises a one-way self locking device which is frictionally engageable.

6. The walking aid according to claim 1, further comprising a harness assembly which is removably securable to the engagement member.

7. The walking aid according to claim 1, further comprising a resilient biasing member connected to the lower link for assisting in returning the latter to an original position.

8. The walking aid according to claim 7, wherein the biasing member is a spring.

9. The walking aid according to claim 7, wherein the biasing member is also connected to a pivot connecting the upper link to the engagement member or to the upper link.

10. The walking aid according to claim 1, further comprising a support link pivotally connected to the engagement member and to the lower link.

11. The walking aid according to claim 10, wherein a support bar for supporting the disabled hind legs of the animal is connected to right and left support links.

12. The walking aid according to claim 10, further comprising an extendable and retractable support belt for assisting the animal to overcome obstacles, said support belt when in a refracted state being retained in a housing which also comprises a pivot by which the support link is pivotably connected to the engagement member.

13. The walking aid according to claim 1, wherein the engagement member is a support member for supporting the body portion of the animal.

14. The walking aid according to claim 13, wherein the support member comprises front and rear sections and a pivoting unit connected to each of said front and rear sections by which the body portion of the animal is laterally pivotable.

15. The walking aid according to claim 14, further comprising a harness assembly which is removably securable to the front section.

16. The walking aid according to claim 14, wherein the support member comprises three or more sections and an additional pivoting unit connected to two adjacent sections.

17. The walking aid according to claim 1, wherein the rotatable member is formed with alternating first and second peripheral surfaces, said first and second peripheral surfaces being contactable by the arresting element such that the arresting element is displaceable between adjacent surfaces of said first surfaces during the forward motion of the walking aid and is seatable in an interface between adjacent surfaces of said first and second surfaces following the rearward motion of the walking aid, thereby preventing rotation of said rotatable member in the second rotational direction.

18. The walking aid according to claim 17, wherein the rotatable member is a ratchet wheel and the arresting element is a pawl.

19. The walking aid according to claim 17, wherein the arresting element is a pin and the rotatable member is a variably shaped hub formed with a plurality of alternating first and second camming surfaces along which said pin is slidable, each of said first surfaces defining a circle and each of said second surfaces being J-shaped, wherein said pin is receivable in, and engageable by, a seat defined by an arcuate portion of one of said second surfaces following the rearward motion of the walking aid, thereby preventing additional rotation of the at least one wheel assembly in the second rotational direction.

20. The walking aid according to claim 17, further comprising a wheel attachment formed with a circumferential groove in which a rotatable pin member is insertable for enabling limited rotation in the second rotational direction prior to being rotationally immobilized.

* * * * *